(12) United States Patent
Brown et al.

(10) Patent No.: US 7,281,761 B2
(45) Date of Patent: Oct. 16, 2007

(54) SEAT CONFIGURATION SYSTEM FOR AN AUTOMOTIVE INTERIOR

(75) Inventors: Gregory Philip Brown, Dearborn, MI (US); Warren Nally, South Lyon, MI (US); Thomas Green, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 10/709,403

(22) Filed: May 3, 2004

(65) Prior Publication Data

US 2005/0253433 A1    Nov. 17, 2005

(51) Int. Cl.
- B60N 2/02 (2006.01)
- A47C 7/62 (2006.01)
- A47C 4/54 (2006.01)
- A47C 7/00 (2006.01)

(52) U.S. Cl. ............... 297/95; 297/284.6; 297/188.05; 297/283.3

(58) Field of Classification Search ........... 297/452.34, 297/452.33, 92, 94–99, 100–104, 283.3, 297/283.1, 284.6, 483, 452.35, 452.41, 284.9, 297/DIG. 3, 188.05, 188.06, 411.32, 284.1, 297/284.4, 284.7, 284.8, 216.1, 344.1, 217.3
See application file for complete search history.

(56) References Cited

U.S. PATENT DOCUMENTS

| 505,246 A * | 9/1893 | Hale ........................... 297/95 |
| 0,629,258 A | 7/1899 | Johnston |
| 0,923,197 A | 6/1909 | Murchison |
| 1,096,678 A * | 5/1914 | Budd ........................... 297/99 |
| 1,443,479 A | 1/1923 | Lambert |
| 1,644,528 A * | 10/1927 | Huff ......................... 296/65.13 |
| 2,979,098 A * | 4/1961 | Greaves ...................... 224/275 |
| 3,165,350 A | 1/1965 | Willson |
| 4,168,860 A | 9/1979 | Garza et al. |
| 4,407,542 A | 10/1983 | Kehl et al. |
| 4,487,452 A | 12/1984 | Tanizaki et al. |
| 4,585,273 A * | 4/1986 | Higgs et al. ........... 297/452.18 |
| 4,592,588 A * | 6/1986 | Isono et al. .............. 297/284.6 |
| 4,655,503 A | 4/1987 | Kamijo et al. |
| 4,668,010 A * | 5/1987 | Fujiwara ..................... 297/150 |
| 4,685,719 A | 8/1987 | Hanemaayer |
| 4,779,917 A | 10/1988 | Campbell et al. |
| 4,792,188 A | 12/1988 | Kawashima |
| 5,000,505 A | 3/1991 | Kawashita et al. |
| 5,046,433 A | 9/1991 | Kramer et al. |
| 5,149,171 A | 9/1992 | Gilevich et al. |

(Continued)

FOREIGN PATENT DOCUMENTS

WO    WO 02/14103 A1    2/2002

Primary Examiner—Milton Nelson, Jr.
(74) Attorney, Agent, or Firm—Gregory P. Brown; Brooks Kushman P.C.

(57) ABSTRACT

A unique and versatile seating system for automobiles is provided. The seating system includes aspects to improve the functionality of the seating arrangement while maintaining the safety and comfort of the automotive seats. In certain embodiments, the seating system includes a reversible automotive seat that includes a seat cushion and a backrest. The backrest is movable between a forward seating position and a rearward seating position and includes an integrated restraint system which is operable to secure an occupant seated when the backrest is in either the forward or rearward seating positions.

45 Claims, 21 Drawing Sheets

U.S. PATENT DOCUMENTS

| | | |
|---|---|---|
| 5,197,774 A | 3/1993 | Diaz |
| 5,322,341 A | 6/1994 | Harrison et al. |
| 5,451,009 A | 9/1995 | Rumpf |
| 5,482,354 A | 1/1996 | Gryp |
| 5,524,962 A | 6/1996 | Fulgenzi et al. |
| 5,639,141 A | 6/1997 | Hanemaayer |
| 5,947,541 A | 9/1999 | Behrens et al. |
| 5,967,608 A | 10/1999 | Van Sickle |
| 6,000,742 A | 12/1999 | Schaefer et al. |
| D419,520 S | 1/2000 | Bergh |
| 6,065,798 A | 5/2000 | Sankrithi |
| 6,079,773 A | 6/2000 | Hassan |
| D430,534 S | 9/2000 | Golenz |
| 6,126,218 A | 10/2000 | Karhumaki |
| 6,129,404 A | 10/2000 | Mattarella et al. |
| 6,168,234 B1 | 1/2001 | Haynes et al. |
| 6,199,945 B1 | 3/2001 | Kim |
| 6,315,352 B1 | 11/2001 | Nomura |
| 6,402,246 B1 | 6/2002 | Mundell |
| 6,439,443 B1 | 8/2002 | Liao |
| 6,457,694 B1 | 10/2002 | Haynes et al. |
| 6,471,297 B1 | 10/2002 | Runde et al. |
| 6,474,739 B1 | 11/2002 | Lagerweij |
| 6,474,741 B2 | 11/2002 | Kamida et al. |
| 6,488,333 B2 | 12/2002 | Kim |
| 6,494,531 B1 | 12/2002 | Kim |
| 6,575,420 B2 | 6/2003 | Yoshida et al. |
| 6,715,825 B2 * | 4/2004 | Tame .......................... 297/94 |

\* cited by examiner

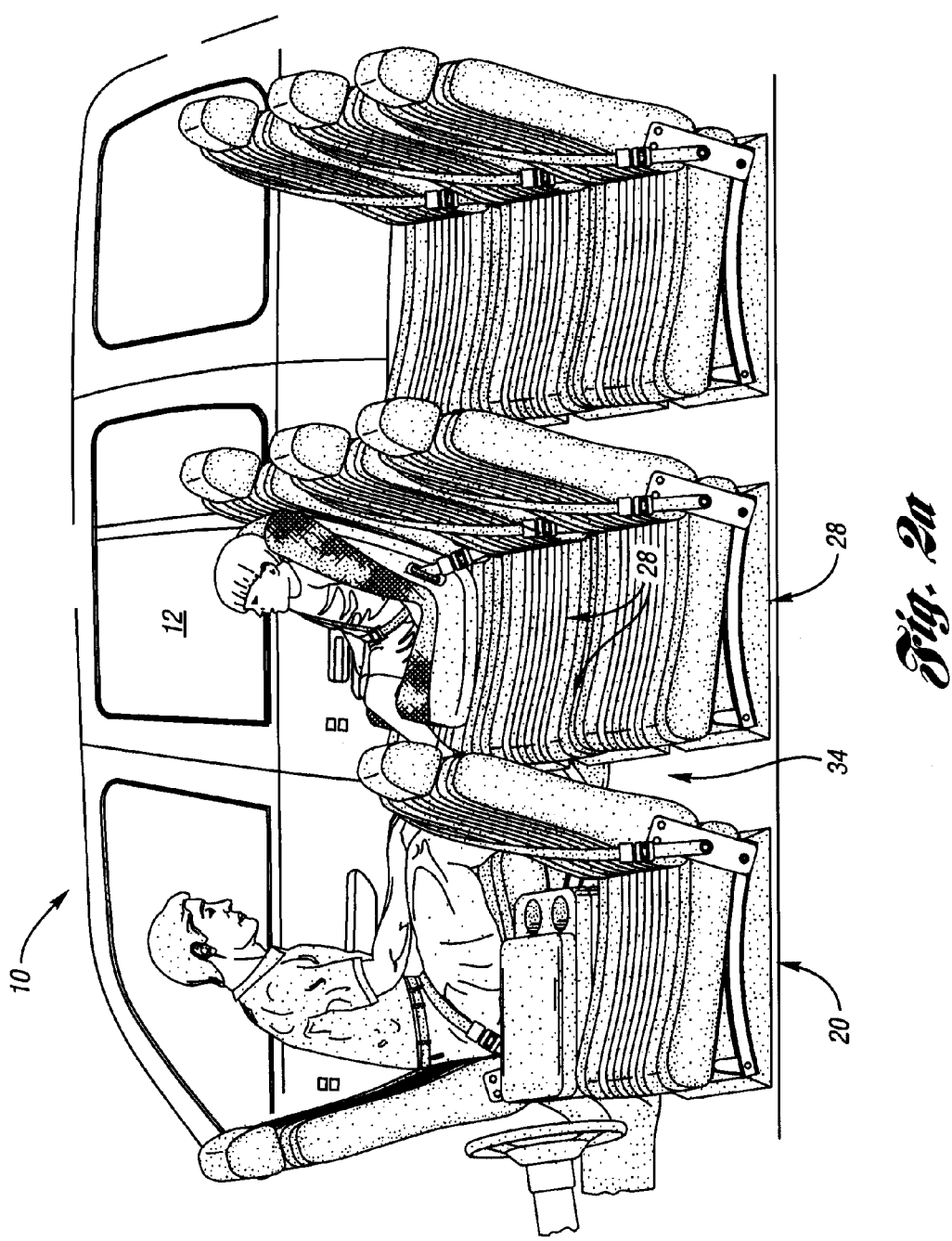

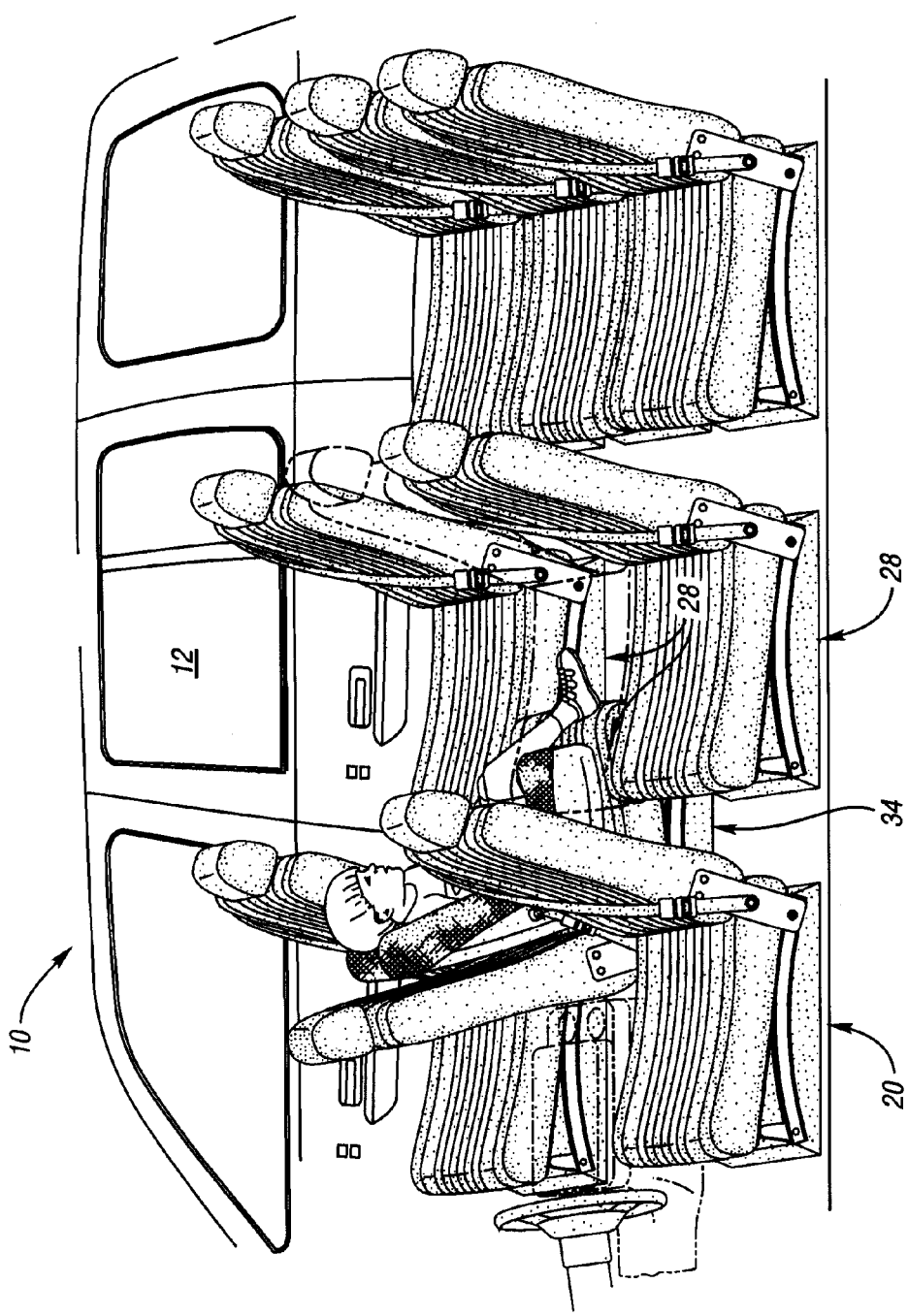

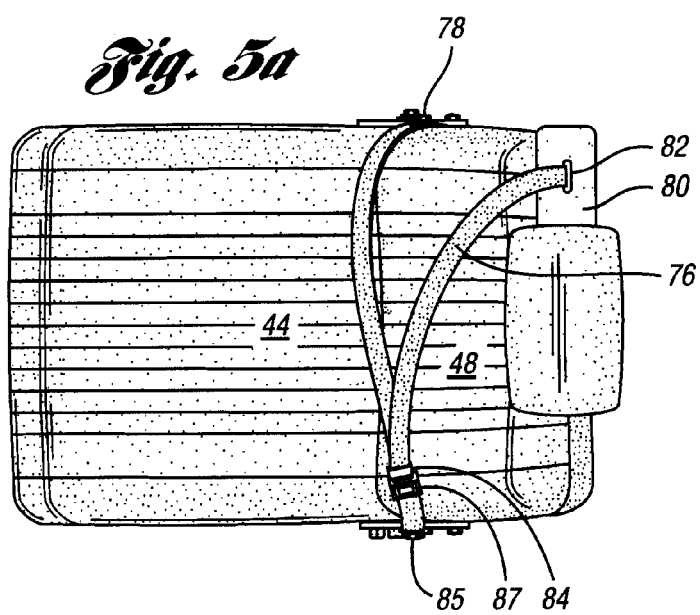
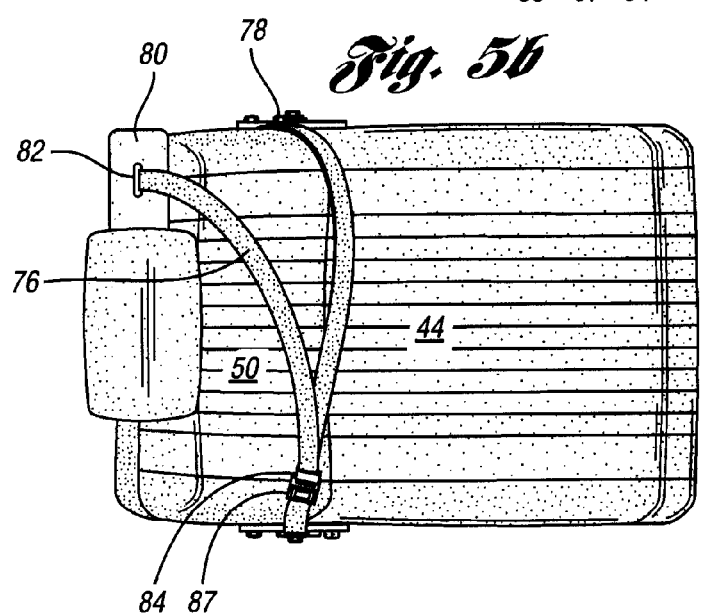
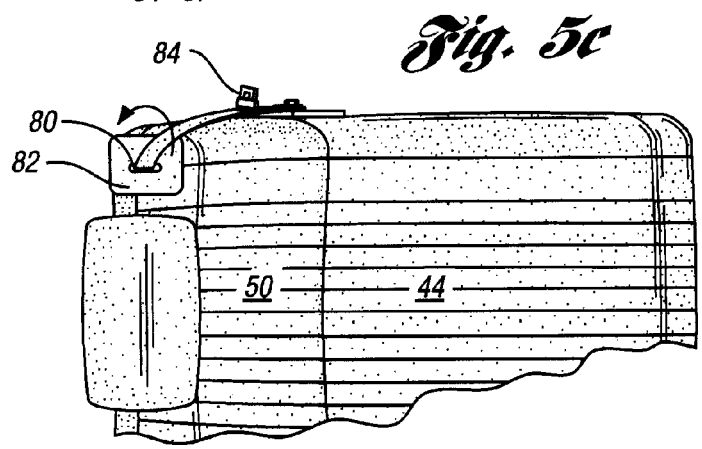

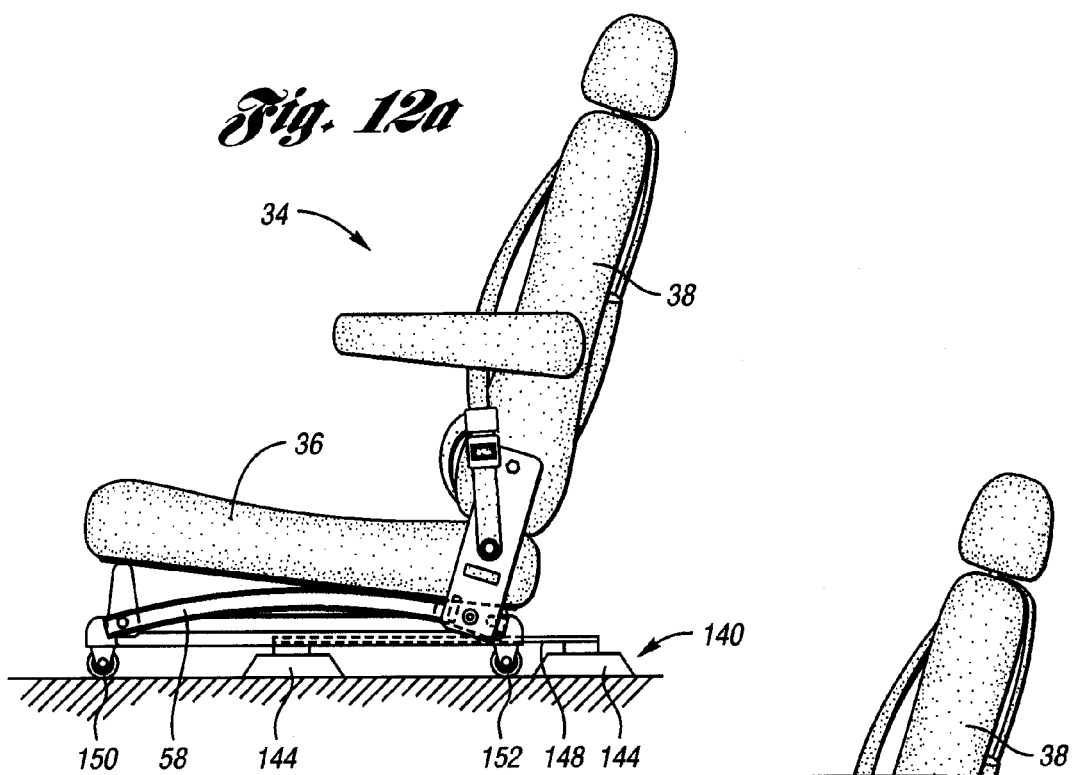
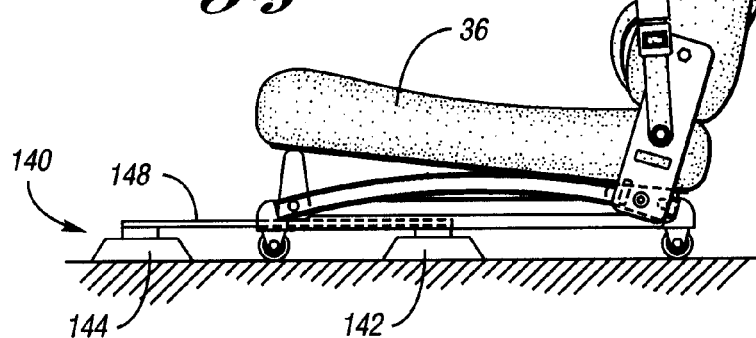
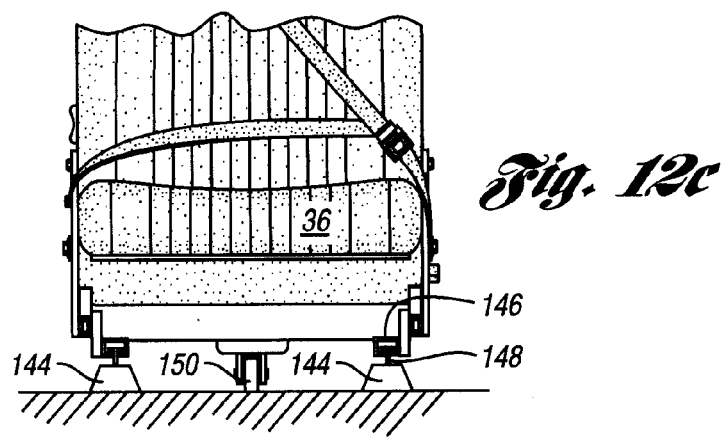

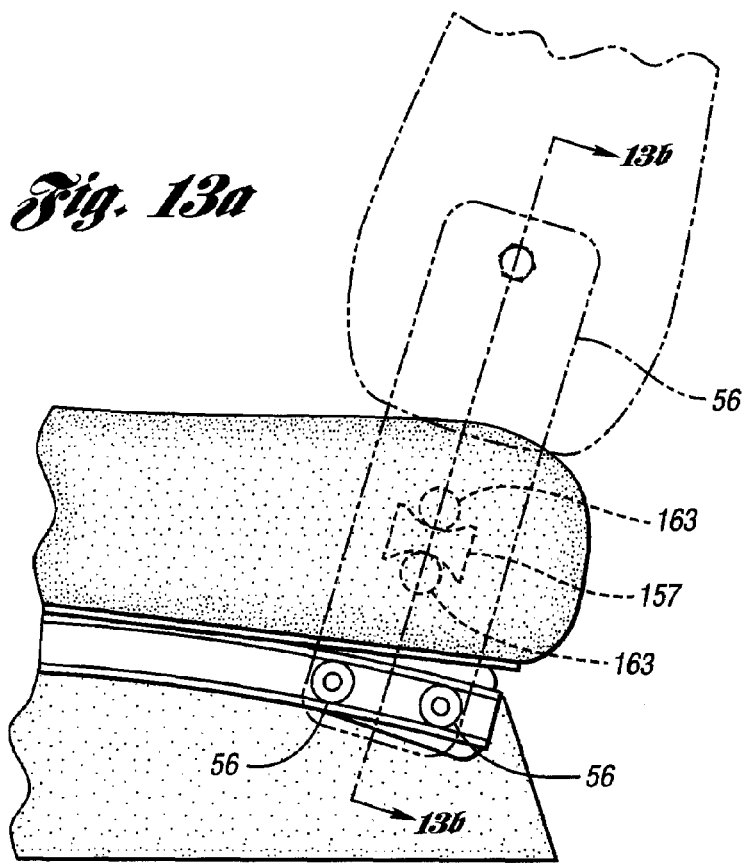
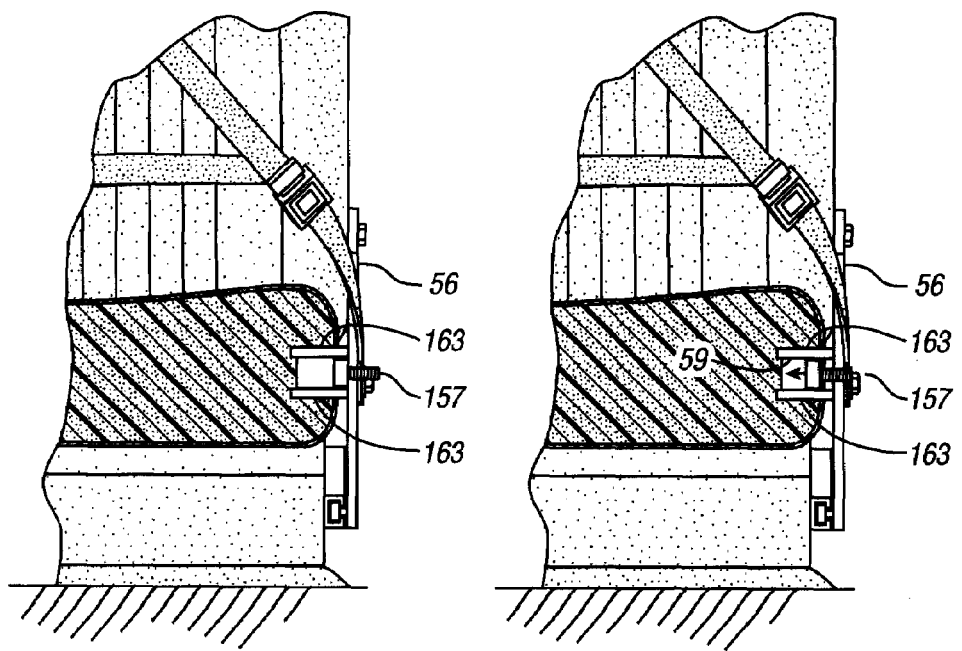

SEAT CONFIGURATION SYSTEM FOR AN AUTOMOTIVE INTERIOR

BACKGROUND OF INVENTION

1. Field of the Invention

The invention relates to seating arrangements and configurations for automotive vehicles, and, in particular, to seating systems for flexible, comfortable and safe automotive travel.

2. Background Art

Comfort, convenience and versatility are at a premium for today's modern traveler. Accordingly, the automotive industry has taken significant steps to accommodate the evolving needs of its customers. Examples of such recent improvements in the automotive world include multi-zone climate control systems, passenger entertainment modules, and interior/exterior vision systems.

To meet the needs of its customers, the desire to provide seats adaptable for various travel situations has emerged. Families and other groups often compromise between the need for comfortable and convenient seating arrangements and storage. To accommodate the varying needs amongst potential customers, various seating systems have become known in the art.

One such seating apparatus allows users to detach and remove a vehicle seat from the vehicle's interior to increase the amount of storage space available. The vehicle seat can then be returned to the vehicle should additional seating capacity be needed. While the removable seat application provides increased versatility for hauling either a large amount of cargo, or rather, a large family, inserting and removing such seats can be a cumbersome task. Further, such seats are often limited in their movement and adjustability within the vehicle. Generally, two or more individuals are required to unlatch and remove the seat from the vehicle. Once removed, a storage location for the bulky seat is then needed when the seat can be kept clean and dry.

Other seating devices allow for the flexibility between additional storage and additional seating capacity without necessarily removing one or more seats. For example, many vehicles have foldable seats wherein the backrest can be folded forward towards the seat cushion when not in use to provide additional cargo room. Generally, the folded seat collapses to create a portion of a floor for a cargo area. Such seats are popular in SUVs and vans, but have also been introduced into the backseat of cars to access the trunk. While such seating devices are convenient for rapidly alternating between extra cargo room and extra seating, they provide little versatility for varying the seating configuration to adjust for a host of traveling situations.

Recent trends show that today's travelers have a greater need for flexibility in their automotive interiors. More individuals are taking their business on the road and spend a great deal of time in their automobile. Still others have young families they wish to take on long drives, perhaps during a vacation. To better accommodate the needs of these travelers, more flexible seating arrangements and configurations are in need. For example, nothing currently in production provides for a flexible, convenient, safe, and comfortable way to travel while still allowing passengers to conduct business face-to-face. Further, families are not afforded the option of allowing their children to either face forward or rearward, without concern over seat belt restraint mechanisms or unsafe air bag deployment.

The previous known seating systems are problematic with regard to flexibility convenience, safety, and/or comfort. The present invention overcomes the above disadvantages by providing a unique and truly versatile seating arrangement and configuration system that maintains comfort and safety standards during vehicle operation.

SUMMARY OF INVENTION

Therefore, it is an aspect of the present invention to provide a truly unique and versatile automotive seating system.

It is another aspect of the present invention to provide an apparatus for flexible, convenient, and versatile seating during automotive travel, including safe and comfortable alternative seating arrangements and configurations.

Another aspect of the present invention is to provide automotive seating having a reversible seat wherein the backrest can be adjusted to face either forward or rearward.

Yet another aspect of the present invention is to provide reversible seats that allow the backrest to slide from the rear end of the seat cushion towards the front end of the seat cushion enabling the backrest to position in either the fore or the aft position.

Yet another aspect of the present invention is to provide automotive seating wherein both sides of the backrest are contoured to offer comparable comfort, support, and safety in either the rearward-facing or forward-facing directions.

Still another aspect of the present invention is to provide safe, convenient, and flexible automotive seating arrangements and configurations for all types of travel, including conferencing/work areas for the business traveler and entertainment/play areas for the traveling family.

Still another aspect of the present invention is to provide safe, convenient, and flexible reversible seats that can function similarly in either the forward-facing or rearward-facing direction, including seat cushion adjustment vertically in both the front and rear, horizontally, and reclining.

Still yet another aspect of the present invention is to provide safe, convenient, and flexible automotive reversible seats wherein the seat belt restraint system can adapt to properly restrain passengers facing either forward or rearward.

Still yet another aspect of the present invention is to provide safe, convenient, and flexible automotive seating wherein airbag deployment can be deactivated upon adjusting the reversible seats in the rearward-facing direction.

Yet another aspect of the present invention is to provide a rotatable headrest to provide comparable comfort in a reversible seat when the seat is either forward-facing or rearward-facing.

And still yet another aspect of the present invention is to provide safe, convenient, and flexible reversible seating wherein a map pocket or pouch is attached to the seat such that it can alternate its position in relation to the backrest depending on whether the backrest is in the fore or aft position.

Accordingly, numerous automotive seats of the present invention are disclosed in this application. One such automotive seat comprises a seat cushion having a front portion and a rear portion. A backrest is coupled to the seat cushion and is movable between a forward seating position (front facing) and a rearward seating (rear facing) position. In the forward seating position, the backrest adjoins the rear portion of the seat cushion. In the rearward seating position, the backrest adjoins the front portion of the seat cushion. The backrest contains a front face and a back face. When in the forward seating position, a seating surface, generally defined by the front face of the backrest and the seat cushion, is provided. The seat cushion is tilted to provide an inclination from the seat back toward the edge of the seat for comfort and safety. However, when the backrest is in the rearward seating position, the seating surface is generally defined by the back face of the backrest and the seat cushion. Further when in the rearward seating position, the inclination of the seat cushion is reversed to provide comparable comfort and safety.

Other seats disclosed also comprise a restraint system integrated with the backrest for securing a seat occupant thereto. The restraint system is adaptable for securing the seat occupant when the backrest is in either the forward seating position or the rearward seating position. Moreover, the front face and the back face of the backrest are substantially similarly contoured, both of which having lateral supports.

Still other automotive seats described comprise an airbag deactivation device. The airbag deactivation device allows for a vehicle airbag to be deployed upon a vehicle collision when the backrest is in the forward seating position. However, the airbag deactivation device deactivates the airbag when the backrest is moved to the rearward seating position.

Also provided with other automotive seats disclosed is a recline mechanism for altering the angle between the backrest and the seat cushion. The recline mechanism is operable with the backrest in either the forward or rearward seating positions. A pair of armrests pivotally attached to the backrest, are also adapted between the forward seating position and the rearward seating position. Moreover, a two-way adjustable lumbar support is retained within the backrest between the front face and the back face. The lumbar support is selectively adjustable to support an occupant when the backrest is in either the forward or rearward seating positions.

Correspondingly, an automotive vehicle interior having a seating arrangement system is provided. The automotive vehicle comprises an interior having a front cabin, a rear cabin, and an intermediate cabin. A first row of seats generally located within the front cabin of the interior is provided. Behind the first row of seats is a second row of seats, generally parallel to the first row and located within the intermediate cabin of the interior. Finally, a third row of seats, generally parallel to and positioned behind the second row, is located within the rear cabin of the interior. The vehicle utilizes at least one of the numerous seats disclosed and may include a seat cushion and a backrest movable between a forward seating position and a rearward seating position. The backrest adjoining a rear portion of the seat cushion when in the forward seating position, while the backrest adjoins a front portion of the seat cushion when in the rearward seating position. The backrest further comprises a front face and a back face, both substantially similarly contoured. Further, the seat includes a two-way lap and shoulder restraint system integrated with the backrest for use in connection with either the front face or the back face of the backrest.

Further the at least one of the numerous seats disclosed may be located in the second row such that the at least one seat can be adjusted so that the backrest is in the rearward seating position, allowing an occupant to face the third row of seats. Moreover, the at least one seat can be located in the third row such that the at least one seat can be adjusted so that the backrest is in the rearward seating position, allowing an occupant to face the rear of the vehicle. Finally, the at least one seat is located in the first row such that the at least one seat can be adjusted so that the backrest is in the rearward seating position, allowing an occupant to face the second row of seats.

The above aspects and other objects, features, and advantages of the present invention are readily apparent from the following detailed description of the best mode for carrying out the invention when taken in connection with the accompanying drawings.

BRIEF DESCRIPTION OF DRAWINGS

FIG. 2a is a perspective view of a certain embodiment of the present invention;

FIG. 2c is another perspective view of a certain embodiment of the present invention;

FIG. 3d is a side view of another reversible seat in the forward seating position;

FIG. 4d is a plan view illustrating the shoulder strap of one of the seats of the present invention;

FIG. 5a is a top view of a reversible seat in the forward seating position;

FIG. 5b is a top view of the reversible seat in FIG. 5a in the rearward seating position;

FIG. 5c is a top view of the reversible seat in FIG. 5a illustrating pivotal movement of the seat belt bezel;

FIG. 12a is a side view of one of the seats of the present invention illustrated in its forward most position;

FIG. 12b is a side view of the seat of the present invention shown in FIG. 12a in its rear most seating position;

FIG. 12c is a frontal view of the seat of the present invention shown in FIG. 12a;

FIG. 13a is a side view of one of the seats of the present invention illustrating a locking mechanism for the seat back;

FIG. 13c is a frontal view with a cross section through the seat cushion illustrating the locking mechanism of one of the seats of the present invention in the locked position;

FIG. 13d is an alternate locking arrangement for one of the seats of the present invention illustrated in the unlocked position;

FIG. 14a is a side view of an alternate embodiment of one of the seats of the present invention illustrating a seat back locking mechanism;

FIG. 14b is a frontal view with a cross section through the seat cushion illustrating the locking mechanism illustrated in FIG. 14a;

FIG. 15d is a front view of one of the seats of the present invention illustrated in the forward seating position.

DETAILED DESCRIPTION

Figure 1A:
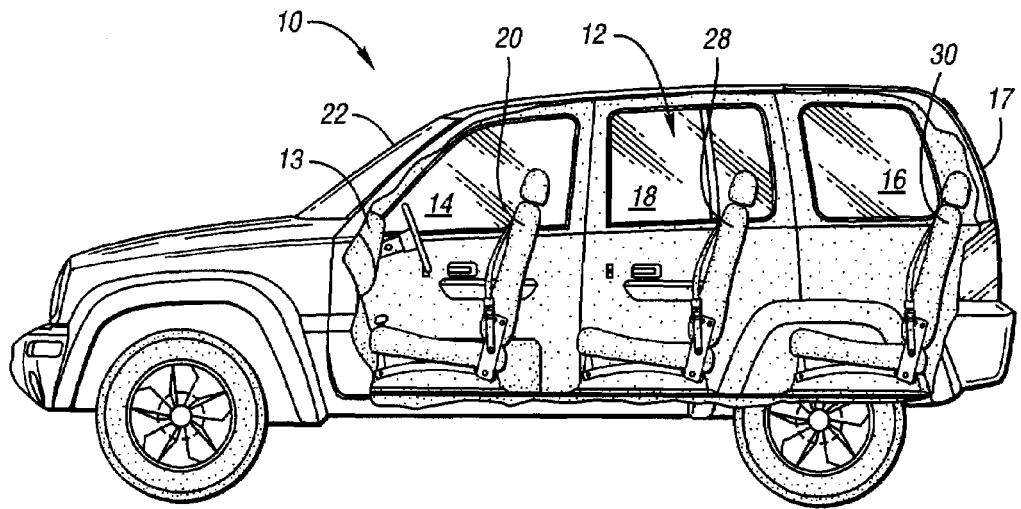
FIG. 1a is an environmental view of a vehicle interior having a reversible seat, according to a certain embodiment of the present invention.

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

One aspect of the present invention is directed to an apparatus and system for providing a more flexible interior package for automotive vehicles described in greater detail below, the system, according to the present invention, allows vehicle passengers to readily adapt their seating arrangement to be more conducive to practical travel situations, without compromising passenger comfort and safety. The ability of the system of the present invention to allow unique and versatile seating options decreases the burden on passengers when traveling via automobile.

Referring generally to FIGS. 1a-1d, vehicle 10 having a flexible interior package in accordance with a certain embodiment of the present invention is illustrated. Vehicle 10 is preferably a sport utility vehicle (SUV), van, or any such vehicle having at least three rows of seats, but may also be included in a standard sedan-type vehicle. Vehicle 10 includes interior 12 comprised of front cabin 14, rear cabin 16, and intermediate cabin 18. Front cabin 14 generally encompasses the area of interior 12 nearest the instrument panel 13, while rear cabin 16 generally encompasses the area of interior 12 nearest the rear of vehicle 10. Correspondingly, intermediate cabin 18 generally encompasses the area interposed between front cabin 14 and rear cabin 16.

Figure 1B:
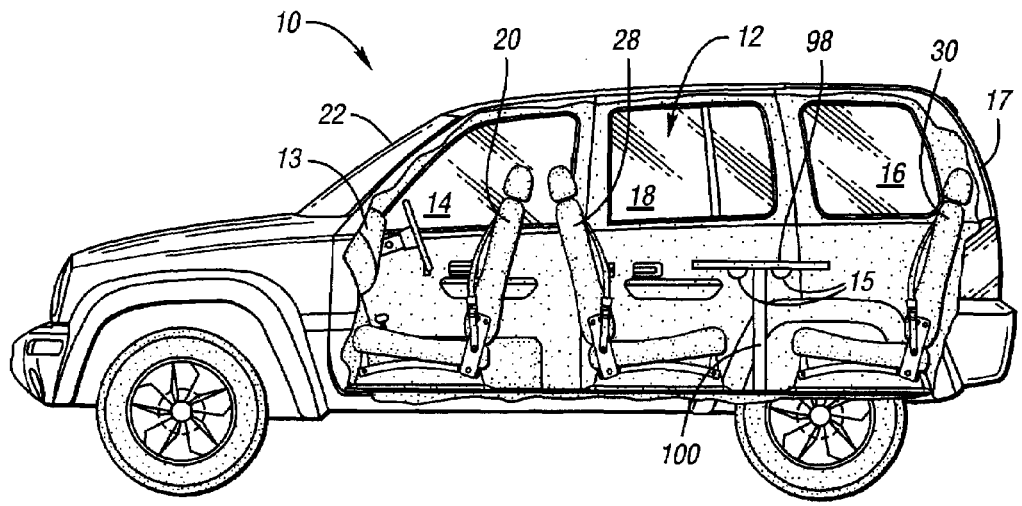
FIG. 1b is an environmental view of a vehicle interior having a reversible seat, according to an alternate embodiment of the present invention.
Figure 1C:
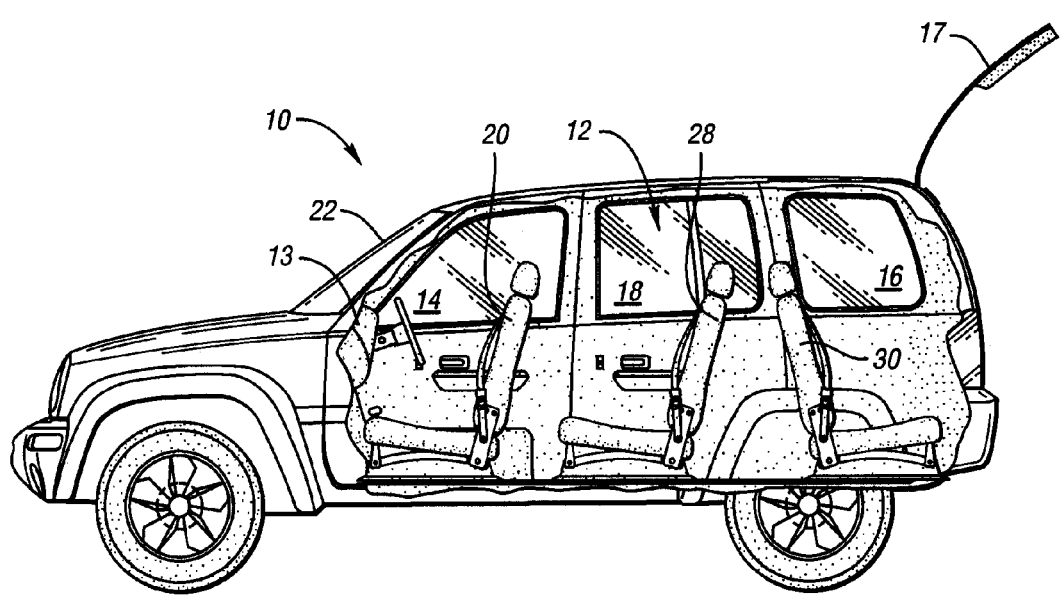
FIG. 1c is an environmental view of a vehicle interior having a reversible seat, according to yet another embodiment of the present invention.

Interior 12 further comprises first row seats 20 located within front cabin 14. Preferably, at least two seats comprise first row 20. Typically, as shown in FIGS. 1a-1c, first row seats 20 face forward toward windshield 22 and are generally aligned laterally across vehicle 10. In a certain embodiment, each seat in first row 20 is capable of translating linearly along the vehicle floor between a fore position, towards the front of vehicle 10, and an aft position, towards the rear of vehicle 10. It is therefore contemplated that any apparatus and method for providing horizontal travel of a vehicle seat between a fore position and an aft position can be utilized in accordance with the present invention, such as is known in the seat track art. For example, International Publication No. WO 02/14103 A1 discloses such a seat track arrangement, and is hereby incorporated by reference. An improved and unique seat track arrangement is also disclosed herein and described subsequently with regard to FIGS. 12a-12c.

Front cabin 14 is further defined by a forward boundary and a rearward boundary. The forward boundary, for example, can be dashboard 13 or some other object generally defining a boundary between interior 12 and an engine compartment of vehicle 10. The rearward boundary, on the other hand, is generally defined by the rearmost limit of a seat in first row 20 when translated in the aft position.

Second row of seats 28 is generally located within intermediate cabin 18. Preferably, at least two seats comprise second row 28. More preferably, three seats comprise second row 28. Second row 28 is generally parallel to and positioned behind first row 20, as depicted in FIGS. 1a-1c. In a certain embodiment, each seat in second row 28 is capable of translating linearly along the vehicle floor between a fore position, towards the front of vehicle 10, and an aft position, towards the back of vehicle 10, similar to first row 20. Again, it is contemplated that any apparatus and method for providing horizontal travel of a vehicle seat between a fore position and an aft position can be utilized in accordance with the present invention. Further, the rearmost limit of a seat in second row 28 when translated in the aft position defines the boundary between intermediate cabin 18 and rear cabin 16.

Finally, third row of seats 30, generally located within rear cabin 16, is provided. Preferably at least two seats comprise third row 30. More preferably, three seats comprise third row 30. Third row 30 is generally parallel to and positioned behind second row 28, as illustrated in FIGS. 1a-1d. Like first row 20 and second row 28, each seat in third row 30 may be capable of translating linearly along the vehicle floor between a fore position, towards the front of vehicle 10, and an aft position, towards the back of vehicle 10. It is contemplated that any apparatus and method for providing horizontal travel of a vehicle seat between a fore position and an aft position can be utilized in accordance with the present invention, such as is known in the seat track art. Further, rear cabin 16 is bounded to the rear by an object such as liftgate 17, or a rear door, or possibly an additional row of seats. It is fully contemplated that additional rows of seats can be provided without limiting the scope of this invention.

Figure 3A:
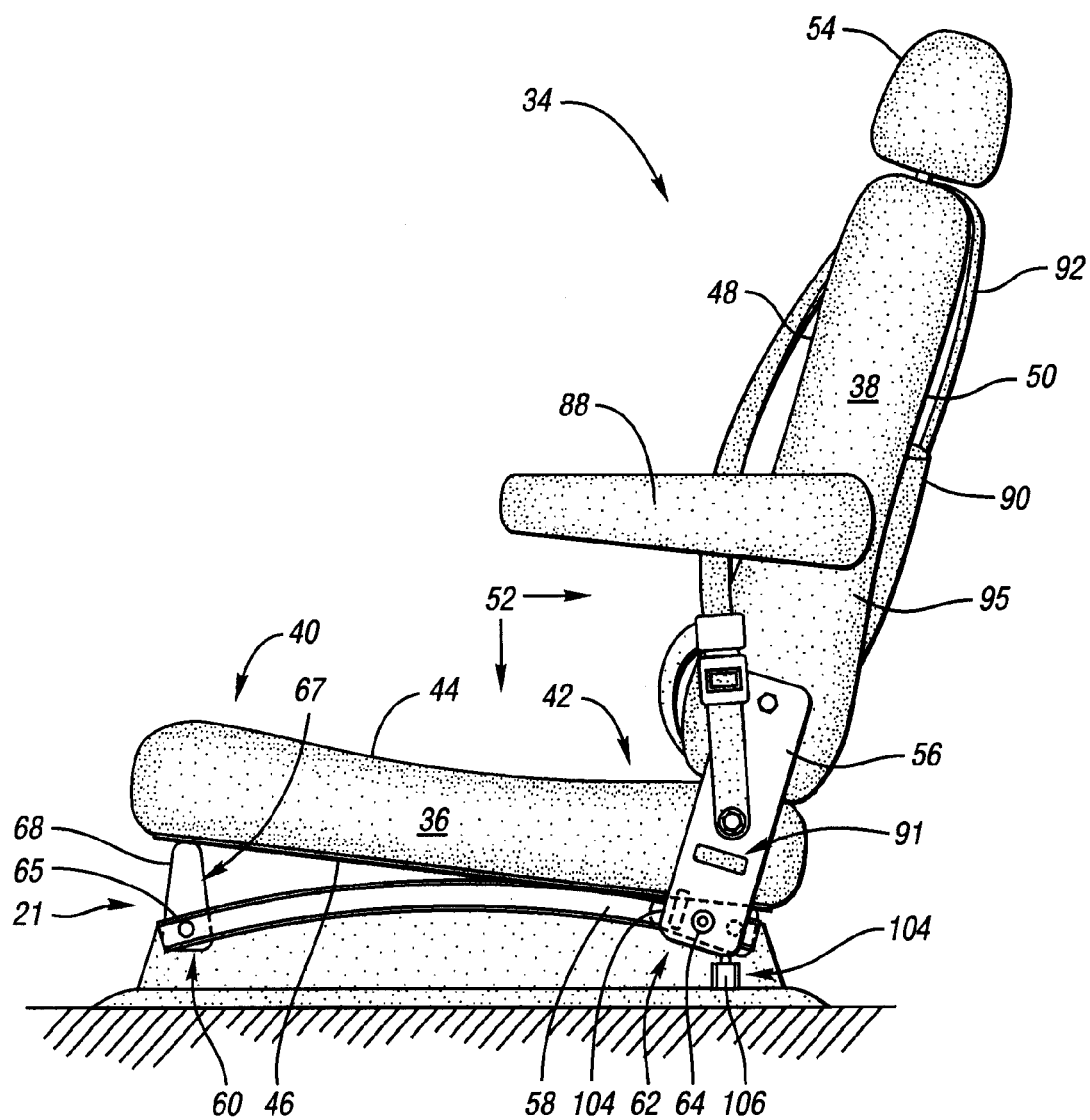
FIG. 3a is a side view of a reversible seat in the forward seating position.
Figure 3B:
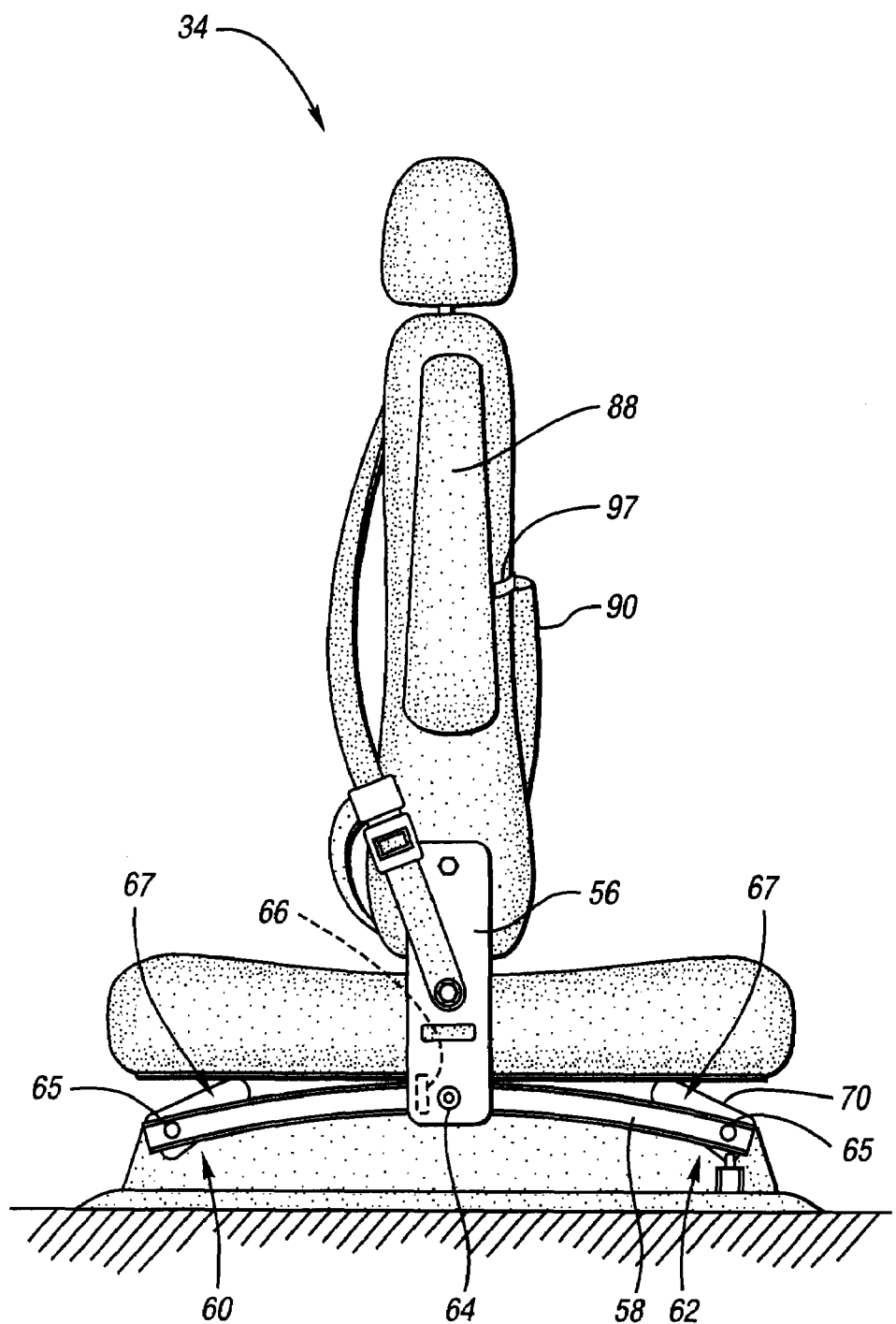
FIG. 3b is a side view of a reversible seat in FIG. 3a being translated from the forward seating position to the rearward seating position.
Figure 3C:
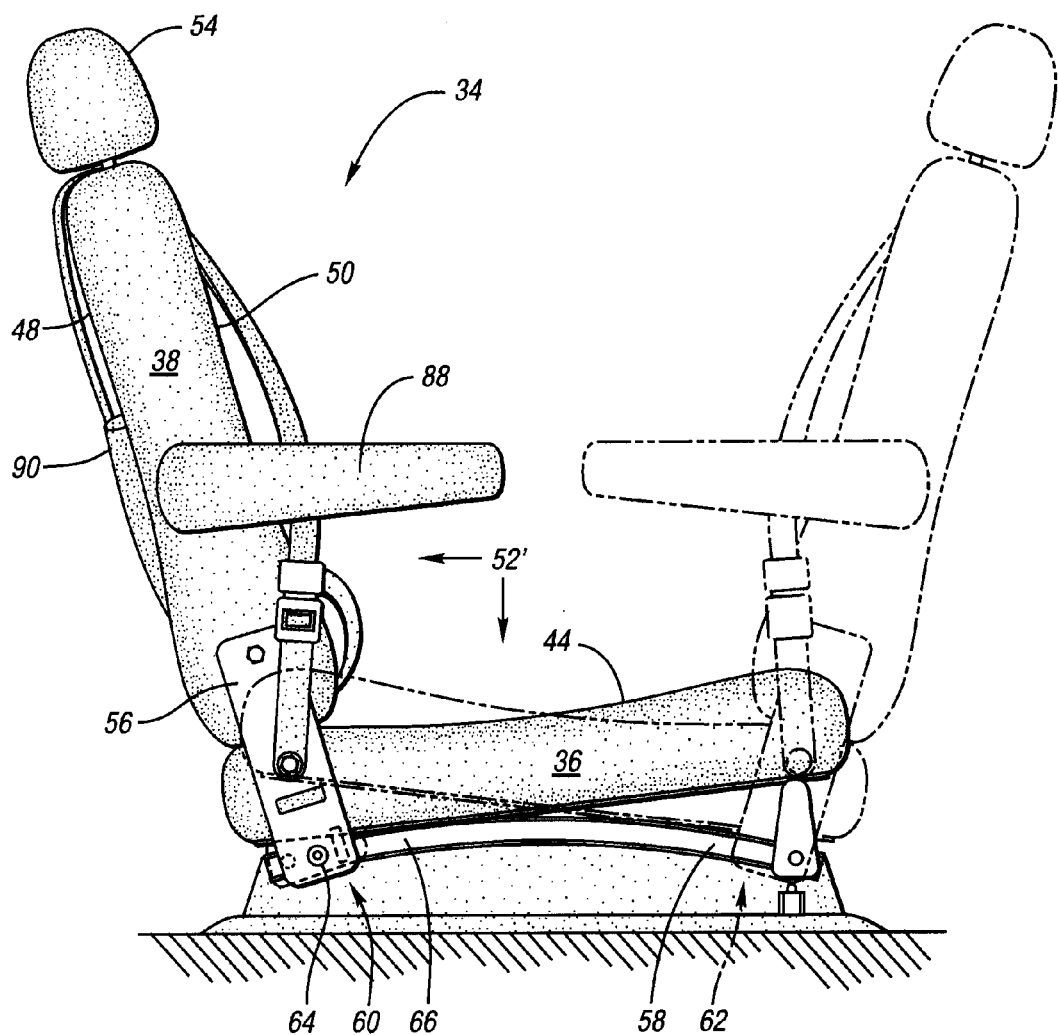
FIG. 3c is a side view of a reversible seat in FIG. 3a in the rearward seating position including the reversible seat in the forward seating position shown in phantom.
Figure 3B:
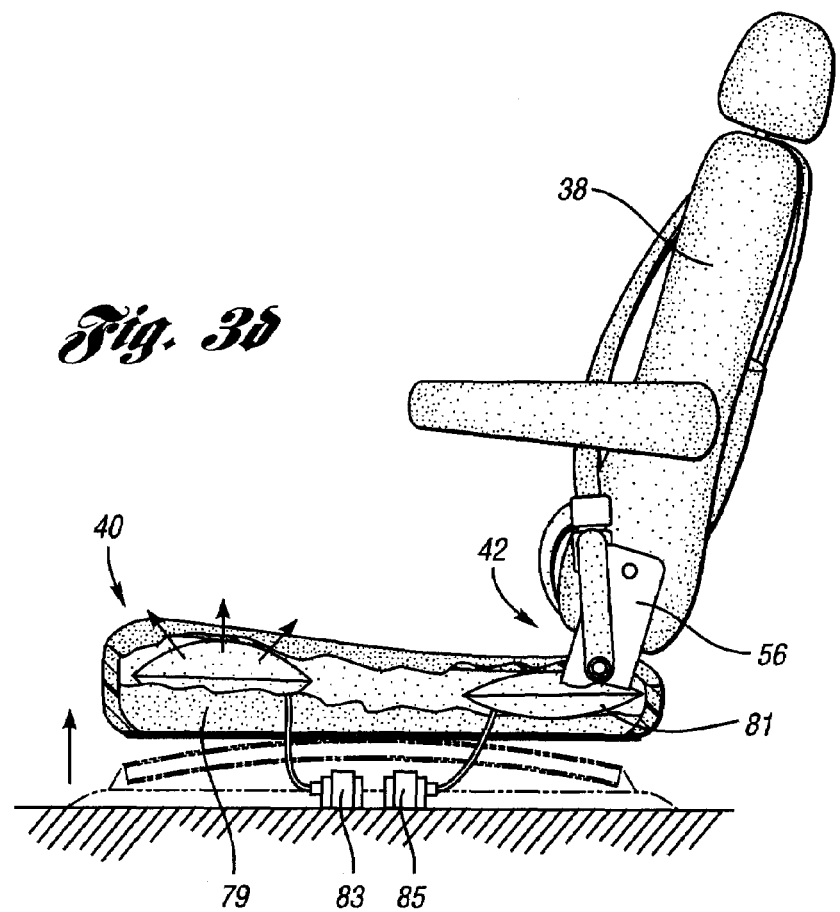

Referring now to FIGS. 3a-3c, a seat 34 according to a certain embodiment of the present invention is illustrated. Reversible seat 34 is generally comprised of seat cushion 36 and backrest 38. Seat cushion 36 includes front portion 40, rear portion 42, upper surface 44, and lower surface 46. Seat cushion 36 is operatively coupled to supporting structure 21. Front portion 40 is the portion of seat cushion 36 nearest the front of vehicle 10, while rear portion 42 is the portion of seat cushion 36 nearest the rear of vehicle 10. Preferably, upper surface 44 is contoured to provide lateral support, best shown in FIG. 4a. Moreover, upper surface 44 is generally symmetrical such that front portion 40 and rear portion 42 are substantially similarly contoured to allow an occupant to sit on seat cushion 36 and comfortably face either forward or rearward.

Backrest 38 is coupled to seat cushion 36 such that it is movable between a forward seating position (FIG. 3a) and a rearward seating position (FIG. 3c). The term seat cushion is used herein, but it should be appreciated that the term is intended to include not only the cushion itself but all related structure such as the seat base, rail or anchor. When backrest 38 is adjusted in the forward seating position, adjoining rear portion 42 of seat cushion 36, reversible seat 34 faces forward, as is illustrated in FIG. 3a. When backrest 38 is adjusted in the rearward seating position, adjoining front portion 40 of seat cushion 36, reversible seat 34 faces rearward, as illustrated in FIG. 3c. Accordingly, backrest 38 has front face 48 and back face 50, may be substantially similarly contoured and adapted to support an occupant's back which rests thereupon. For example, an occupant in reversible seat 34 is supported by front face 48 of backrest 38 when backrest 38 is in the forward seating position. Alternatively, an occupant in reversible seat 34 is supported by back face 50 of backrest 38 when backrest 38 is in the rearward seating position. Preferably, both front face 48 and back face 50 are contoured to provide lateral support. Therefore, an occupant can comfortably rest in reversible seat 34 while facing rearward without foregoing any of the comfort normally obtained from standard non-reversible automotive seats.

Figure 6A:
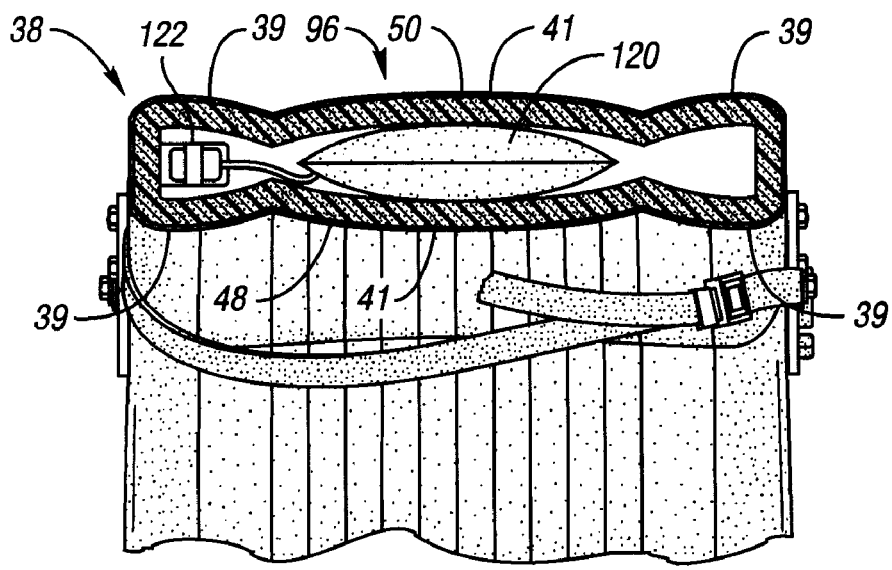
FIG. 6a is a top sectional view of a reversible seat taken along the line 6a-6a shown in FIG. 4a, and illustrating a lumbar support feature.
Figure 6B:
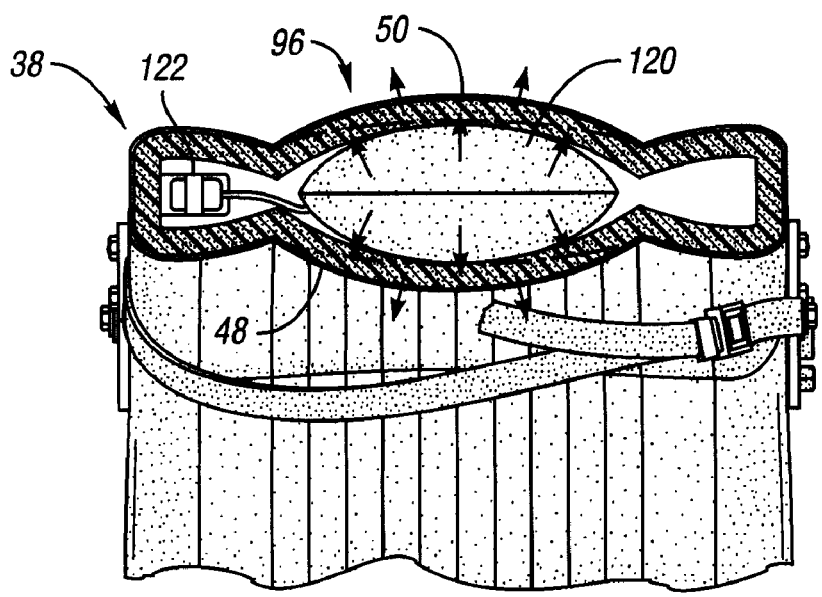
FIG. 6b is a top sectional view of the reversible seat in FIG. 4a illustrating the lumbar support of FIG. 6a activated.

Alternate constructions and designs of a seat back for use in the present invention are further disclosed in FIGS. 6a-6d when the substantial similar contour of the seat back is shown in detail. As shown, the cross section of a seat back 38 include side lateral supports 39 and center support 41. The lateral supports in 39 and center supports 41 are disposed on both the front face 48 and back face 50 of the seat back 38. As can be appreciated by viewing FIG. 6a, a desirable shape for seat back 38 is contoured to provide lateral support when used in both a forward and a rearward seating position. FIGS. 6a-6b also disclose lumbar support 96 is illustrated within backrest 38. Lumbar support 96 provides varying degrees of back support depending on the preferences of a seat occupant. Lumbar support 96 can provide sufficient support to a user whether seated when backrest 38 is in the forward seating position or rearward seating position. In a certain embodiment, lumbar support 96 comprises bladder 120 and pump and solenoid assembly 122. The solenoid is electrically coupled to rocker switch 124 (shown in FIGS. 4a-4b). The depression of rocker switch 124 in one direction activates pump and solenoid assembly 122, thereby inflating bladder 120. The inflation of bladder 120 causes both front face 48 and back face 50 to extend outward effectuating support for occupants regardless of whether they face forward or rearward, as depicted in FIG. 6b. Of course, if less support is desired, a user merely depresses rocker switch 124 in the opposite direction to relieve bladder 120.

Figure 6C:
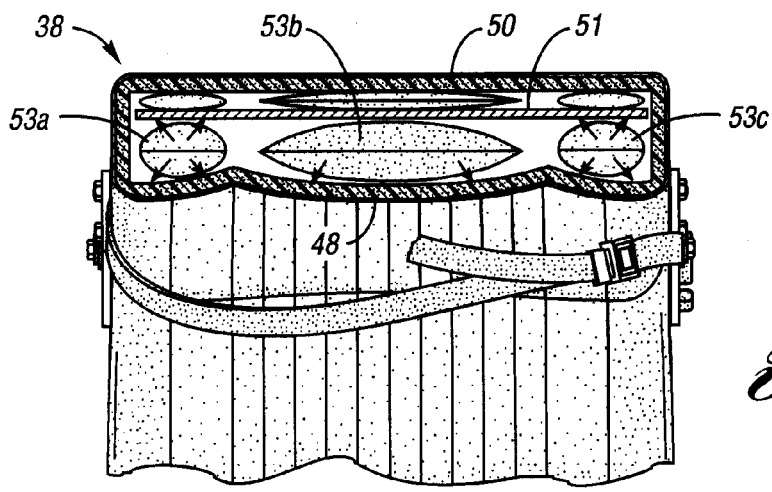
FIG. 6c is a top sectional view of a reversible seat taken along the line 6a-6a shown in FIG. 4a illustrated in the forward seating position.
Figure 6D:
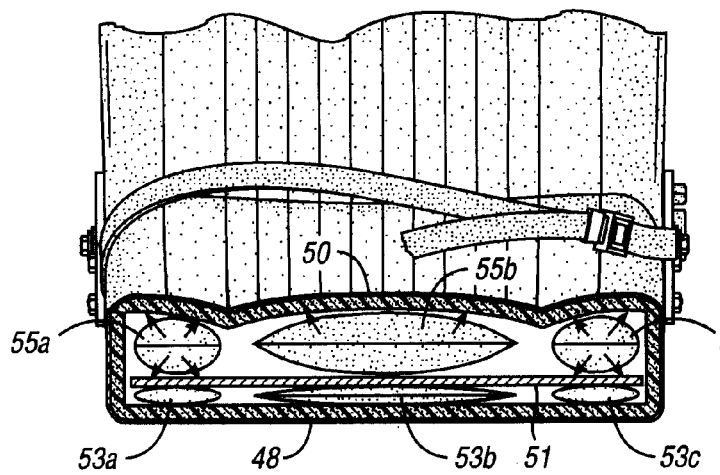
FIG. 6d is a view of the cross section of the reversible seat in FIG. 6c shown in the rearward seating position.

FIGS. 6c and 6d provide an alternative arrangement for the substantially similarly contoured seat back 38 of FIGS. 6a and 6b. In FIG. 6c, the back face 50 of the seat back 38 is substantially planar. However, front face 48 is appropriately contoured to provide lateral support for the occupant. The construction of the seat back 38 includes a center plate 51 with at least one airbag or bladder 53a, 53b and 53c disposed near the front face the bladders can be inflated to provide the appropriate contour for the front face 48. When in the rearward seating position, illustrated in FIG. 6d, the airbags 53a, 53b and 53c are substantially deflated disposed on the opposing side of the center plate 51 is a second compliment of airbags 55a, 55b and 55c which may be inflated to provide a contour to the back face 50 while the seat is in the rearward seating position. It should be noted that the bladders 53 and 55 can be automatically or manually controlled or adjusted by use of an electric motor.

Returning to FIG. 3a, seating surface 52 is illustrated. Seating surface 52 is the surface created by seat cushion 36 and backrest 38 for supporting an occupant when reversible seat 34 is facing forward. Accordingly, seating surface 52 is generally defined by upper surface 44 and front face 48 of seat back 38 when backrest 38 is in the forward seating position.

Seating surface 52' is illustrated in FIG. 3c. Seating surface 52' is the surface created by seat cushion 36 and backrest 38 for supporting an occupant when reversible seat 34 is facing rearward. As such, seating surface 52' is defined by upper surface 44 and back face 50 when backrest 38 is in the rearward seating position. Seating surface 52' is substantially the mirror image of seating surface 52.

Seat 34 further includes headrest 54 affixed to the top of backrest 38. Preferably, headrest 54 is shaped and positioned to provide adequate support for an occupant's head whether backrest 38 is in the forward seating position or the rearward seating position. Most preferably, headrest 54 is contoured such that it affords an occupant the same comfort and safety regardless of which direction the occupant faces when sitting in reversible seat 34. Alternatively, headrest 54 may rotate about the z-axis. For example, headrest 54 may include a single post 57 extending therefrom. Post 57 may include a plurality of slots 59 for setting the height of headrest 54. Post 57 is disposed to extend into an opening 61 in the seat back 38. Operatively coupled to the seat back 38 is an engagement member 63 that is adapted for insertion into one of said plurality of slots 59. The engaging member 63 is biased toward the post 57 by a spring or other suitable structure so as to firmly maintain the headrest 54 in position. It should be appreciated that post 57 can rotate about a z-axis in accordance with the arrow 167. It should also be appreciated that the plurality of openings 59 extend laterally through post 57 such that when headrest 54 is rotated 180° the engaging member 63 may be also used to position the headrest 54 in the desired height position.

Figure 4A:
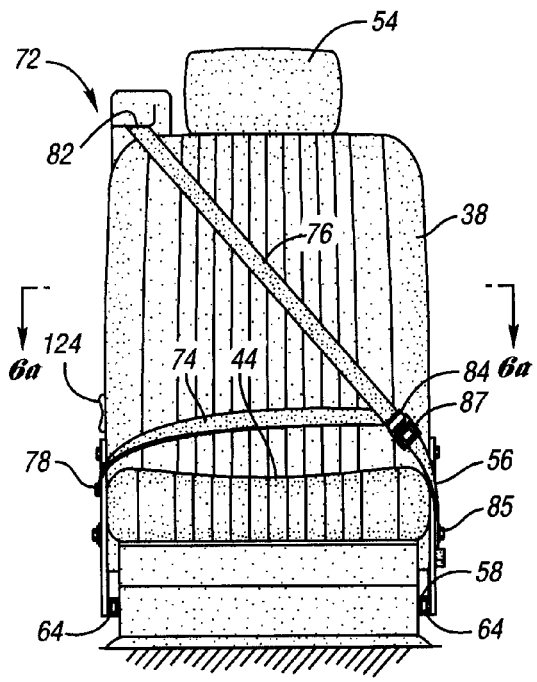
FIG. 4a is a front view of a reversible seat in the forward seating position.
Figure 4C:
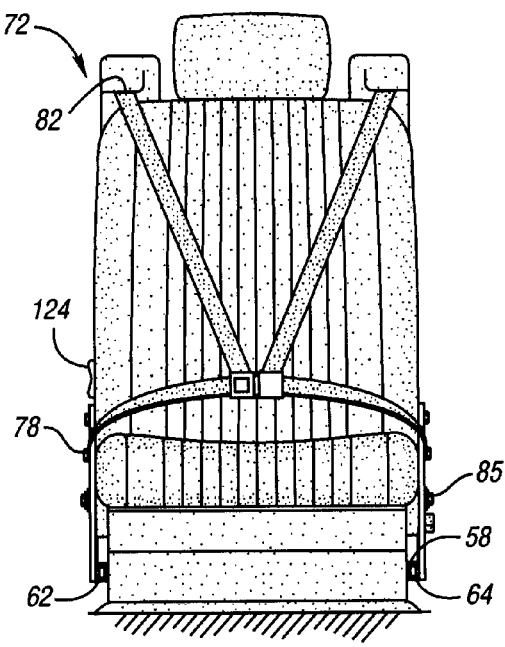
FIG. 4c is an alternate reversible seat in the forward seating position.
Figure 4B:
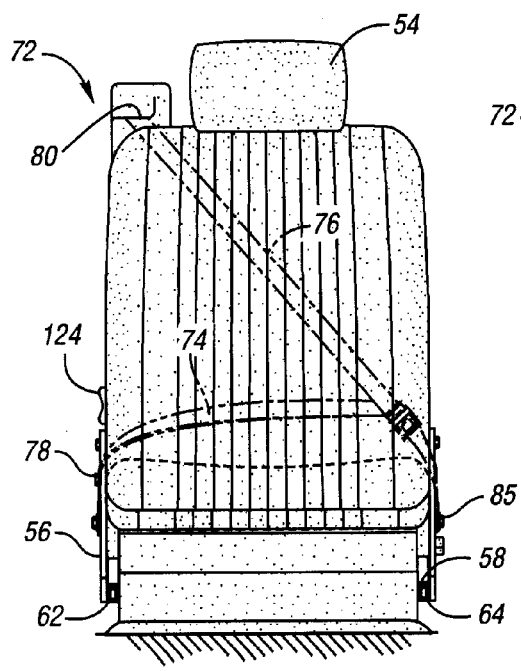
FIG. 4b is a front view of the reversible seat in FIG. 4a in the rearward seating position.
Figure 4B:
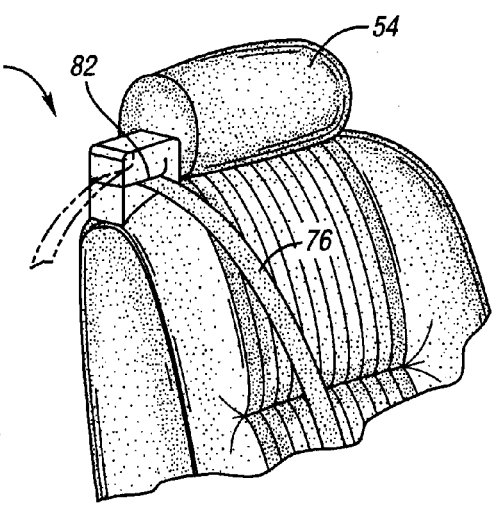

In a certain embodiment, generally illustrated in FIGS. 3a-3c, backrest 38 is slidably movable from a forward seating position to a rearward seating position. Accordingly, backrest 38 is coupled either directly or indirectly (through a related structure) to seat cushion 36 or base by a pair of seat brackets 56, one on either side of reversible seat 34 (see FIG. 4a or 4b). Seat brackets 56 can be either fixedly or pivotally attached to backrest 38 at one end. At the other end, seat bracket 56 is affixed to a pair of laterally spaced guide members 58. Guide members 58 may contact the lower surface 46 of seat cushion 36. The opposing guide members 58 are spaced apart such that each guide member generally runs below a corresponding side of seat cushion 36, as best shown in FIG. 4a. Each guide member 58 extends from first end 60 to second end 62. First end 60 is positioned adjacent front portion 40, while second end 62 is positioned adjacent rear portion 42. Contact members 56 are slidably engaged with guide members 58 by use of a sliding member 64 linking contact members 56 to guide members 58. Sliding member 64 can be a bearing, roller, or the like, that can smoothly travel along guide members 58 from second end 62 corresponding to a forward seating position, to first end 60, corresponding to the rearward seating position. FIG. 3b depicts backrest 38 when sliding from the forward seating position to the rearward seating position at approximately the half-way point of travel.

Guide members 58 can be an arcuate metal track, such as depicted in FIGS. 3a-3c, certain implementations of the present invention may utilize a straight or linear metal track. In either instance, both first ends 60 and second ends 62 may include a locking member 65 for securing backrest 38 in either the forward seating position or the rearward seating position. Locking member 65 prevents backrest 38 from sliding along guide members 58, when it is not desired to do so. Locking member 65 can be a mechanical latch, tether, or the like. Certain locking designs are illustrated in FIGS. 13 and 14. It should be appreciated that instead of using a guide member or related structure to translate the seat back, the seat back may be selectively engageable at a forward position and a rearward position.

Figure 13B:
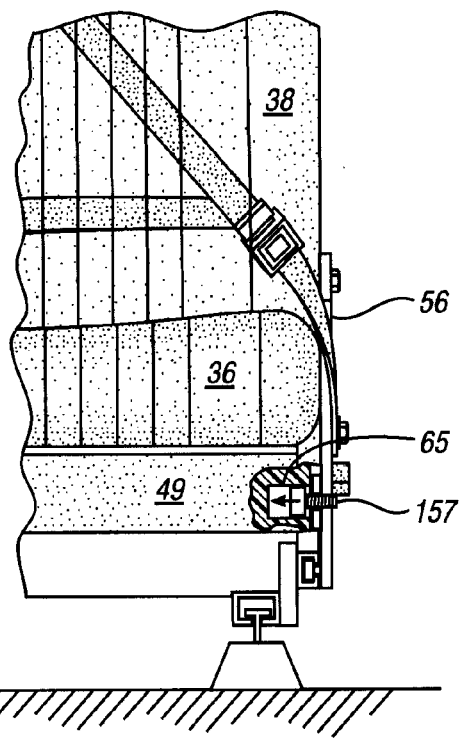
FIG. 13b is a frontal view with a cross section through the seat cushion illustrating the locking mechanism of one of the seats of the present invention in the unlocked position.

FIGS. 13a-13c illustrate a first locking design. As illustrated, the seat bracket 56 includes an action bolt 157 operatively connected thereto. Preferably, the action bolt is formed in a bow-tie shape and is movable from a first position (illustrated in FIG. 13b) and a lock position disclosed in (illustrated in FIG. 13c). The action bolt 157 may cooperate with a reinforced opening formed in the seat cushion 36, or alternatively, stiffening rods 163 formed as part of the seat. Further, it is also contemplated that the action bolt 157 may be attached to the seat cushion and cooperate with a mating hole formed in the seat bracket 56. It also should be appreciated that although the lefthand side of the vehicle seat is illustrated, a similar apparatus is preferably disclosed on the opposing side of the vehicle seat. For simplicity, however, only the lefthand side structure is disclosed in detail herein. It should also be appreciated that action bolt 157 may cooperate with a slot 65 formed in the seat frame structure 67 disposed below seat cushion 38.

Figures 14A, 14B:
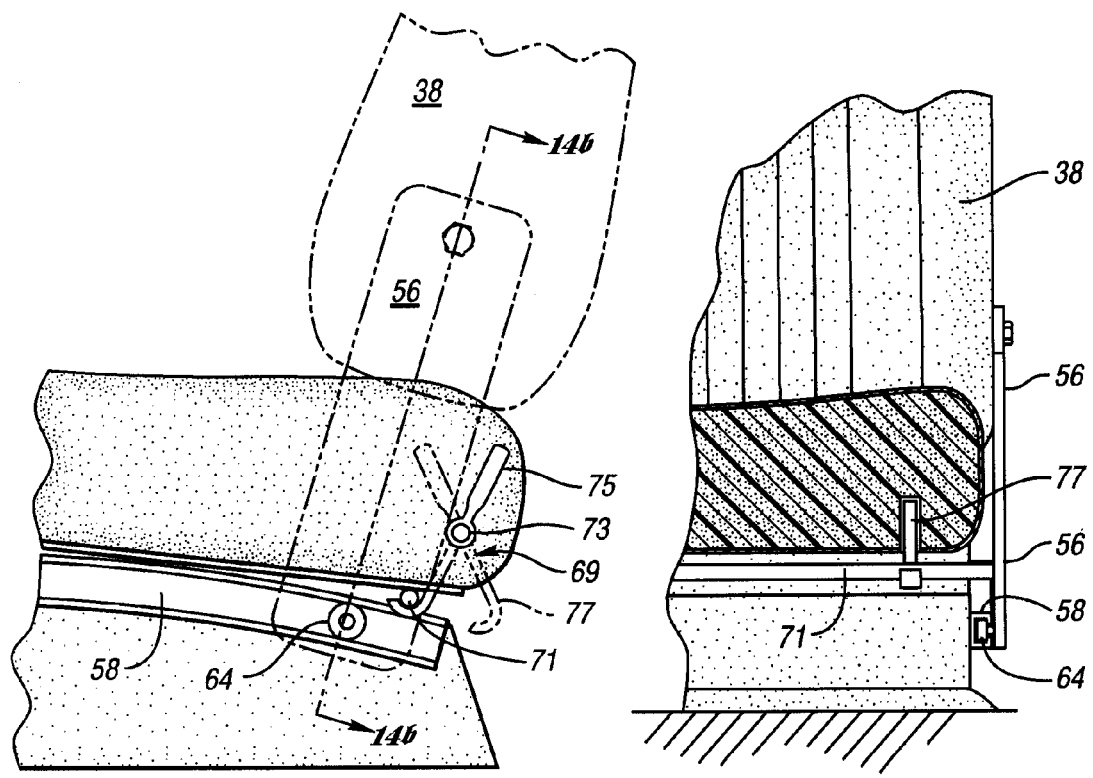
Figure 15A:
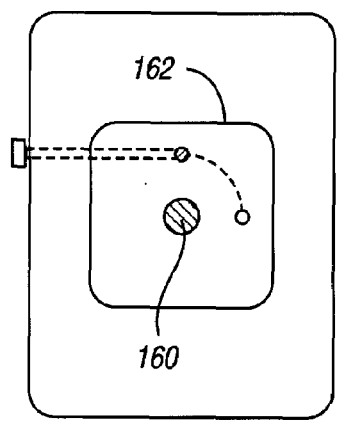
FIG. 15a is a view of a seat plate of one of the seats of the present invention in a forward or rearward seating position.
Figure 15C:
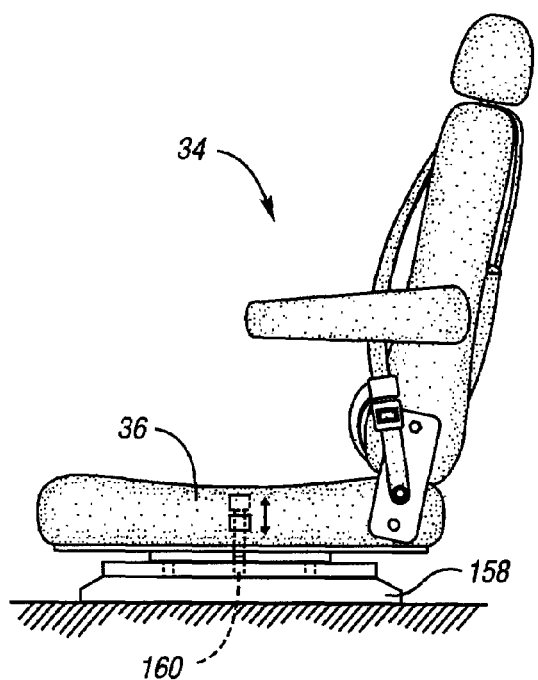
FIG. 15c is a side view of one of the seats of the present invention illustrated in the forward seating position.
Figure 15B:
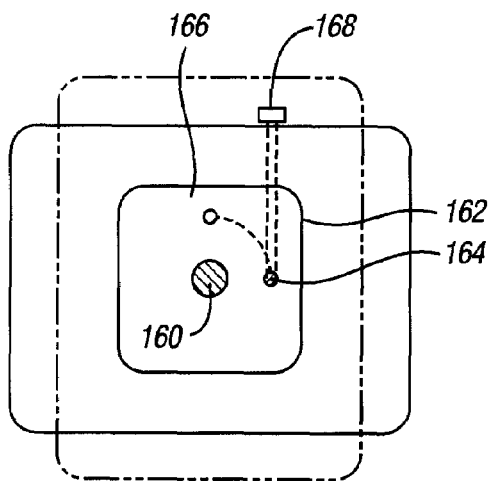
FIG. 15b is a seat plate of one of the seats of the present invention illustrated in the sideward seating position.
Figure 15B:
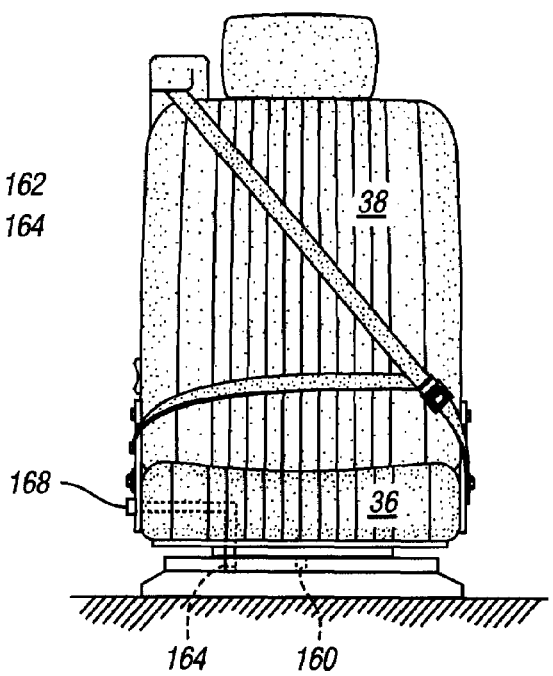

An alternative locking mechanism could be accomplished by way of a pivotable latch 69 and attachment bar 71 illustrated in FIGS. 14a and 14b. The pivotable latch 69 is attached to the seat cushion or related structure is disposed to move about a pivot pin 73 having a first lever hand 75 and a second locking hand 77. Second locking hand 77 is disposed to engage with attachment bar 71 to retain backrest 38 in the desired position. It should be appreciated that pivotable latch 69 can be activated manually, or preferably, activated by electric motor automatically when backrest 38 is in the desired forward or rearward seating position.

Also disclosed in FIG. 13a is an alternate sliding member 64 construction. As illustrated, sliding member 64 can be constructed of two formations or rollers to facilitate ease of travel and support of the backrest.

Returning to FIG. 3, in another certain embodiment, reversible seat 34 further comprises biasing member 67. Biasing member 67 is operably connected to guide members 58 to tilt or incline front portion 40 of seat cushion 36 such that front portion 40 is positioned higher than rear portion 42 when backrest 38 is in the forward seating position. Alternatively, biasing member 67 tilts rear portion 42 such that it is positioned higher than front portion 40 when backrest 38 is in the rearward seating position. Biasing member 67 comprises first pivoting cam 68 and second pivoting cam 70. First pivoting cam 68 is coupled between the first ends 60 of guide members 58, while second pivoting cam 70 is coupled between the second ends 62 of guide members 58. Both first pivoting cam 68 and second pivoting cam 70 are generally vertically biased by a spring, coil, or D.C. motor. When sliding member 64 reaches second end 62 of guide member 58, the vertical bias of second pivoting cam 70 is overcome such that second pivoting cam 70 is caused to be rotated to a more horizontal position, as shown in FIG. 3a. Preferably, sliding member 64 contacts and releases the spring, coil, or D.C. motor that vertically biases the second pivoting cam 70. It should be noted that the D.C. motor used for biasing the pivoting cams 68 and 70 can also be used to provide power to translate the vehicle seat fore and aft on the vehicle floor. Moving sliding member 64 away from second end 62 while transitioning backrest 38 from the forward seating position toward the rearward seating position, second pivoting cam 70 returns to its vertically biased position. Once sliding member 64 terminates in first end 60 of guide member 58, the vertical bias of first pivoting cam 68 is overcome, causing first pivoting cam 68 to rotate toward a generally horizontal position, as illustrated in FIG. 3c. Accordingly, first pivoting cam 68 aligns front portion 40 of seat cushion 36 slightly above rear portion 42 when backrest 38 is moved to the forward seating position. Correspondingly, second pivoting cam 70 aligns rear portion 42 of seat cushion 36 slightly above front portion 40 when backrest 38 is moved to the rearward seating position.

Figure 3E:
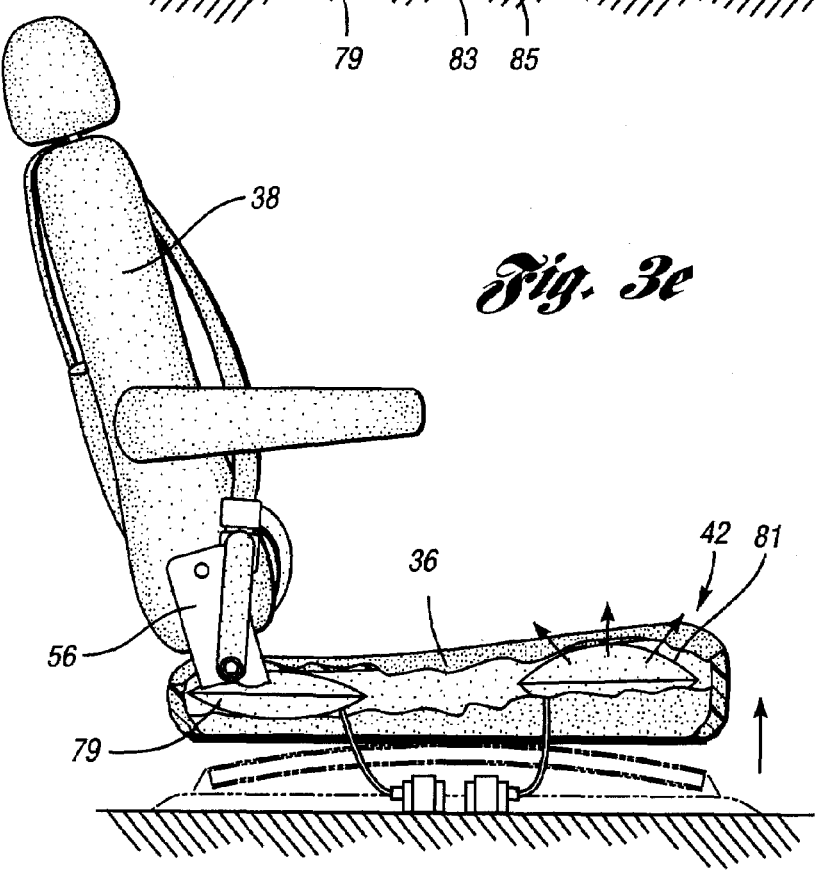
FIG. 3e is a side view of the reversible seat in FIG. 3d in the rearward seating position.

An alternate tilting or inclination mechanism is illustrated in FIGS. 3d-3e. The front portion of the seat cushion 40 may be raised by inflating a front bladder 79 via an electric D.C. motor. To lower the front portion 40 of cushion 36, bladder 79 is deflated. The rear portion 42 of cushion 36 can then be raised by inflating a second rear bladder 81 as shown in FIG. 3e. Each bladder 79 and 81 is illustrated as being operated by a separate motor 83 and 85. It should be, however, appreciated that both may be inflated by the use of only one motor. The inflating and deflating of bladders 79 and 81 corresponds to the position of the backrest 38, such that when the backrest 38 is in the forward seating position, front bladder 79 is inflated while rear bladder 81 is deflated providing an inclination such that the front portion 40 of the seat cushion 36 is positioned higher than the rear portion 42 of the seat cushion 36. As the backrest 38 is transitioned to the rearward seating position, the first bladder 79 is deflated and the rear bladder 81 is inflated automatically to provided an inclination such that the rear portion 42 of the seat cushion 36 is positioned higher than the front portion 40 of the seat cushion 36.

Figure 3F:
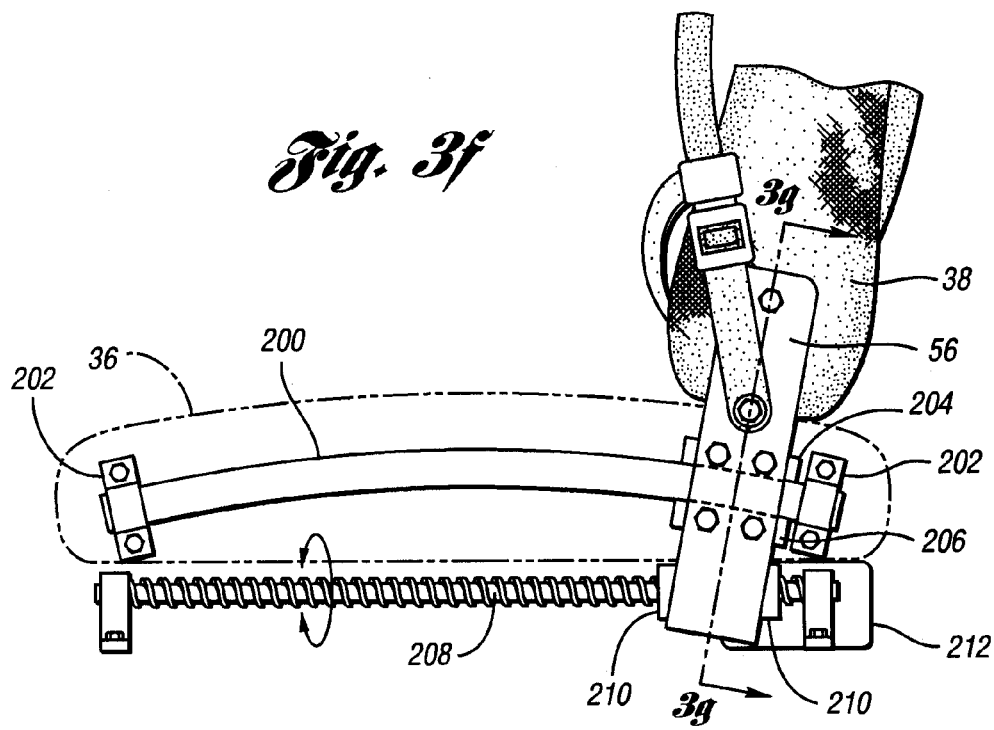
FIG. 3f is a side view of another reversible seat in the forward seating position.
Figure 3G:
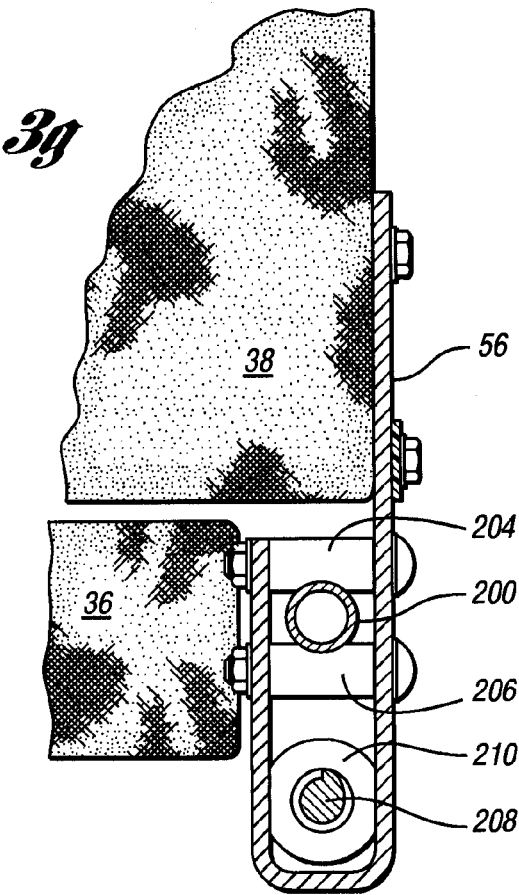
FIG. 3g is a cross-sectional view along the line, 3g, of FIG. 3f.

FIGS. 3f and 3g illustrate yet another reversing mechanism of the present invention. FIG. 3e includes an illustration of a guide tube 200. The tube is attached at its ends to the seat cushion 36 or related structure. Attachments brackets 202 couple the guide tube to the seat cushion. The backrest 38 includes a seat back bracket 56. The seat back bracket 56 is preferably J-shaped as shown in FIG. 3g. Attached to the seat back bracket 56 is a pair of follower blocks 204 and 206. Follower blocks 204 and 206 are adapted to cooperate with guide tube 200 to provide a track upon which seat back 38 is translated from a forward seating position to a rearward seating position. Seat back bracket 56 also is attached to a screw 208 with a pair of nuts 210. Screw 208 is attached to a DC motor 212. Activation of the motor causes the screw to rotate which turns around nuts 210 and causes seat back 38 to transition from a rearward seating position to a forward seating position.

In yet another certain embodiment, reversible seat 34 includes armrests 88 pivotally attached to backrest 38 for providing support for an occupant's arms. Preferably, armrests 88 can pivot approximately 180°. As shown in FIG. 3a, armrests 88 is positioned such that it can be utilized when backrest 38 of reversible seat 34 is in the forward seating position. Should an occupant desire to move backrest 38 to the rearward seating position, then armrests 88 can be rotated about a pivot to provide similar arm support, as illustrated in FIG. 3c. Of course, if an occupant does not desire to utilize armrests 88, then the occupant can rotate armrests 88 to a vertical position alongside backrest 38, as depicted in FIG. 3b.

Figure 7:
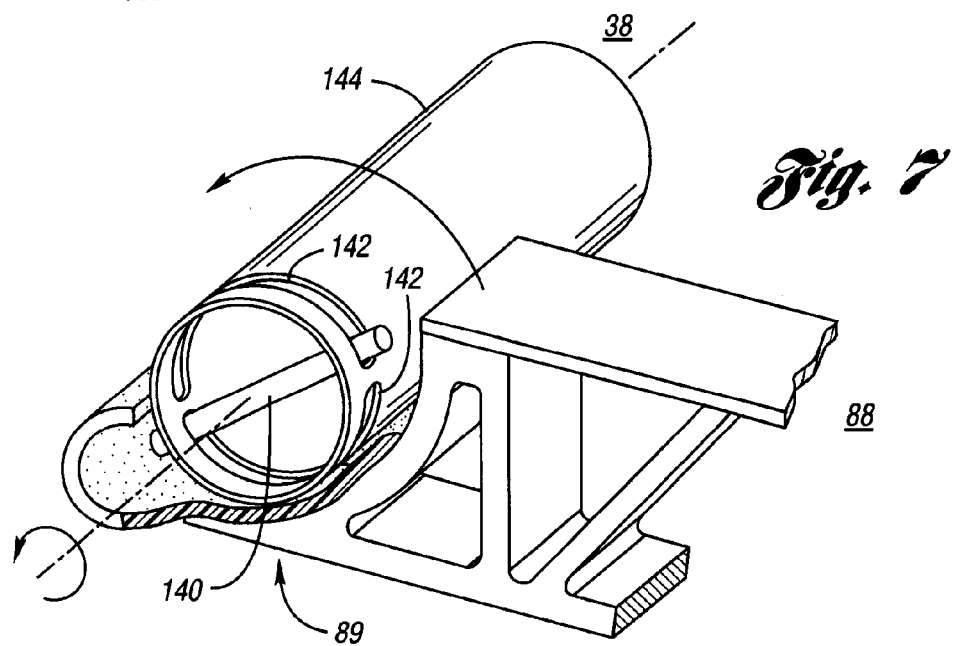
FIG. 7 is a perspective view of the stop mechanism internal to an armrest according to a certain embodiment of the present invention.

Referring now to FIG. 7, the internal mechanical interaction of armrest 88 and backrest 38 is illustrated. Armrest 88 further comprises armrest stop 89 operably connected to armrest 88. Armrest stop 89 which, in the preferred embodiment, is a mechanical stop formed by pin 140 which extends through two semi-circular circumferential slots 142 in tube 144 fixedly attached to backrest 38. Stop 89 prevents movement of armrest 88 below a generally horizontal plane whether rotated to support the arm of an occupant in the forward or rearward seating position.

With reference to FIGS. 4a-4d, restraint system 72 is preferably a three-point restraint system having lap strap 74 and shoulder strap 76. However, it is fully contemplated that other restraint systems may be available for use in the present invention, such as the 4-point restraint system illustrated in FIG. 4c. Restraint system 72 is fully integrated with backrest 38, and reversible such that it can be utilized when backrest 38 is in either the forward seating position or the rearward seating position. As such, restraint system 72 further comprises lap strap fastener 78 affixed to a bottom corner of backrest 38 and shoulder strap retractor affixed to a top corner of backrest 38. In the present aspect of the invention, shoulder strap retractors have been used for many years. For example, U.S. Pat. No. 5,895,090 discloses a retractor integrated within a seat, and is hereby incorporated by reference. Shoulder strap retractor (disposed within backrest 38) receives the belt through slot 82, best shown in FIG. 4d. Slot 82 extends from the front face 48 of backrest 38 through the side of a collapsible can 89 to the rear face 50 of the backrest. It should be appreciated that shoulder strap 76 can be translated from a first position shown in FIG. 4d to a second position shown in phantom in FIG. 4d for use when the seat backrest is in its rearward facing position.

Another embodiment of a retractor is shown in FIG. 5a where slot 82 is located at its top such that shoulder strap 76 extends and retracts from or near the top of backrest 38. Lap strap 74 is pivotally attached to the side of backrest 38 by lap strap fastener 78. Lap strap 74 and shoulder strap 76 engage seat buckle 84 for securing the lap strap 74 and shoulder strap 76 to a seat latch 87. Preferably, latch 87 is pivotally attached at seat latch fastener 85 to a side of backrest 38 opposite lap strap fastener 78. However, it is fully contemplated that latch 87 can be attached directly to backrest 38, or a similar part movable with backrest 38. When backrest 38 is moved from the forward seating position to the rearward seating position, restraint system 72 is modified from securing an occupant to front face 48 to instead securing an occupant to back face 50. Lap strap 74 and shoulder strap 76 can be reversed so that they extend over backrest 38 proximate back face 50, as is best shown in FIG. 5b. Further, seat latch 87 pivots a sufficient amount to be accessible by an occupant in reversible seat 34 facing rearward for securement to back face 50. Alternatively, the seatbelt retractor may be placed in the lower portion of the backrest 38 such that the lap strap 74 is directed into the retractor. The shoulder strap 76 is then rigidly attached to the backrest 38, preferably at or near the top portion thereof. The slot 82, however, may be pivotably attached via bezel 80 to the backrest 38 such that the bezel may pivot about the backrest to allow the shoulder strap 76 to be positioned on the front face 48 of the backrest when in the forward seating position and on the rear face 50 when the seat is in the rearward facing position as shown in FIG. 5c.

Figure 8:
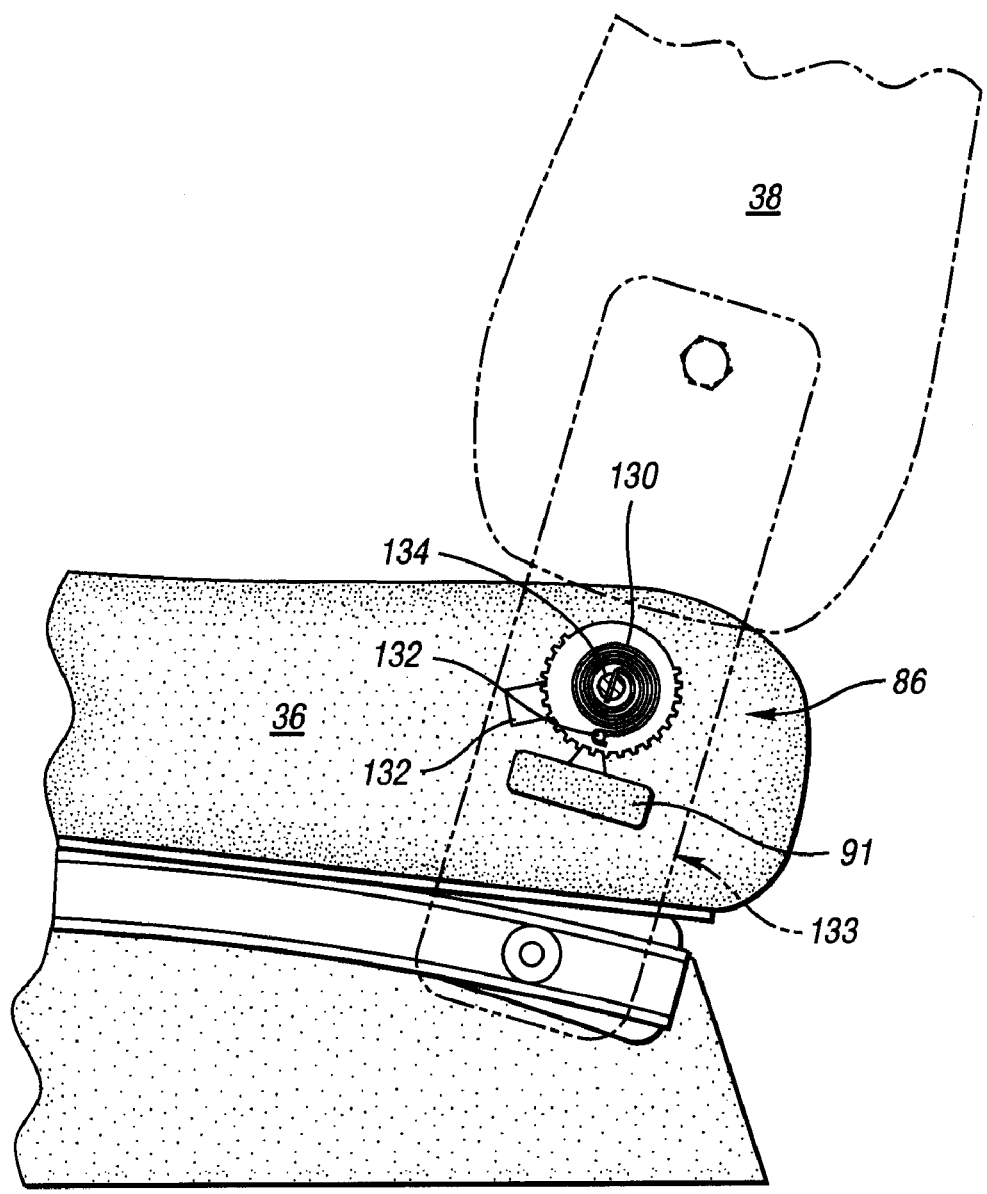
FIG. 8 is a side view detailing the reversible recline mechanism according to a certain embodiment of the present invention.

With regard now to FIG. 8, reversible seat 34 contains recline mechanism 86 for reclining backrest 38. Recline mechanism 86 alters the angle between backrest 38 and seat cushion 36 to adjust to the particular preference of each occupant. Moreover, recline mechanism 86 is operable to adjust the angle of backrest 38 in relation to seat cushion 36 when backrest 38 is in either the forward seating position or the rearward seating position. Recline mechanism 86 is comprised of spring coil 130 having a coil first end 132 and a coil second end 134. First end 132 is affixed to backrest 38, while second end 134 is fixed to either the backrest 38 at its pivot point or to a plate 133 extending from the backrest 38. Spring coil 130 vertically biases backrest 38 to an upright position. Rotational movement about a pivot near the base of backrest 38 causes spring coil 130 to extend or contract, depending on whether a user is reclining backrest 34 in the forward seating position or rearward seating position. In either instance, spring coil 130 desires to return backrest 38 to the biased upright and vertical position. Spring coil 130 can include any number of turns as is necessary to provide a sufficient vertical bias. Moreover, it is contemplated that multiple spring coils may be used in conjunction with the present invention. It is also contemplated to provide a stop mechanism 136 to limit the rotational movement of the backrest 38.

Additionally, it is quite common for the backside of a backrest of an automobile seat to contain a pouch for retaining items such as travel maps, books, or other articles commonly associated with travel for the convenience of the passenger immediately behind the particular seat. Typically, such pouches are sewn or permanently attached to the backside of the backrest. However, such a pouch would not be practical for use in conjunction with a reversible seat because it is permanently attached to the backside of a backrest and would make for an uncomfortable surface for an occupant to rest against, particularly if the pouch contains any items. Accordingly, in yet another certain embodiment, reversible pocket 90 is attached to backrest 38 of reversible seat 34, as shown in FIGS. 3a-3b. Reversible pocket 90 is movable from back face 50 to front face 48 to accommodate reversible seat 34 when backrest 38 is in either the forward seating position or rearward seating position, respectively. Pocket 90 is designed to retain articles for travel similar to that of traditional backrest pouches. Pocket 90, for example, can be selectively attached to back face 50 as shown in FIG. 3a, wherein upper strap 92 is secured around headrest 54. Upon moving backrest 38 from the forward seating position to the rearward seating position, lower strap 94 can be disengaged from the base of backrest 38 so that pocket 90 can be rotated such that it rests against front face 48, as shown in FIG. 3c. Once in position, lower strap 94 can then again be secured to the base of backrest 38. It is, of course, fully contemplated that alternative methods for implementing and securing reversible pocket 90 are available, such as attaching pocket 90 to lateral sides 95 of backrest 38 by an elastic material 97 that allows for the pocket 90 to be moved from the front face 48 to the back face 50 and vice versa by stretching the elastic material 97 such that the pocket 90 can be translated over the backrest 38 as shown in FIG. 3b.

Figure 2B:
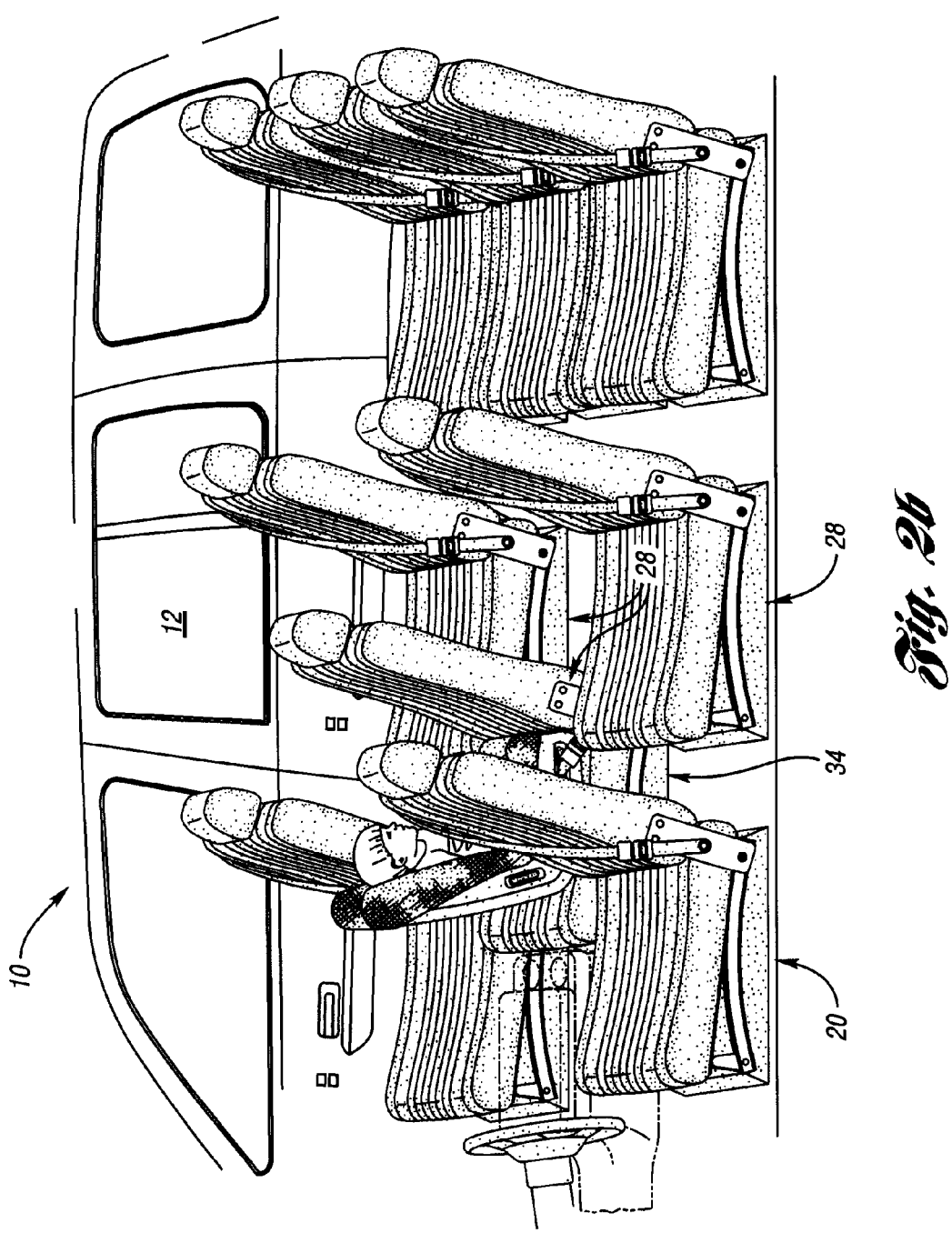
FIG. 2b is another perspective view of a certain embodiment of the present invention.

With reference now to FIGS. 2a, 2b, and 2c, a perspective view of interior 12 of vehicle 10 is provided. In a certain embodiment, at least one seat 34 in second row 28 is equipped with a seat travel mechanism for linearly translating the at least one reversible seat 34 to a fore position and to an aft position. The seat travel mechanism, according to this embodiment, is capable of translating the at least one reversible seat to the fore position such that the at least one reversible seat located in second row 20 surpasses the rearward boundary of front cabin 14, positioning the at least one second row seat between a pair of seats located in first row 20. As a result, at least a portion of the at least one second row seat resides in front cabin 14. In this instance, a driver or a passenger in first row 20 can more readily attend to an infant or child occupying the at least one second row seat. Moreover, the at least one second row seat can be reversible seat 34 adaptable between a forward seating position and a rearward seating position. For example, the at least one second row seat translated to the fore position such that a portion of it resides in front cabin 14 can be adapted to the rearward seating position for securing an infant seat thereto.

A mechanism to provide for linearly translating the seat is illustrated in FIGS. 12a-12c. The translation mechanism includes a base support 140 which preferably includes two mounting structures 142 and 144. A base track 146 is disposed connecting mounting structures 142 and 144. A mating seat track 148 is attached either directly or indirectly to seat cushion 36 and may extend the length of the seat cushion 36. Seat track 148 matingly attaches to base track 146 for linear travel thereon. Vehicle seat 34 can be translated from a fore-position (illustrated in FIG. 12a) to an aft-position (illustrated in FIG. 12b). It should also be appreciated that there may be a base track disposed on each lateral side of seat cushion 36. Likewise, there may be two seat tracks 148 disposed on lateral sides of the seat cushion. Further, seat cushion 36 has disposed therefrom at least one caster 150 used to ensure balance and smooth transition of the vehicle seat 34. Additionally, the seat may include a second caster 152 disposed near the rear portion 42 of the seat cushion 36. As illustrated in FIGS. 12a and 12b, seat 34 can be translated substantially from a fore-position to an aft-position.

Figure 9A:
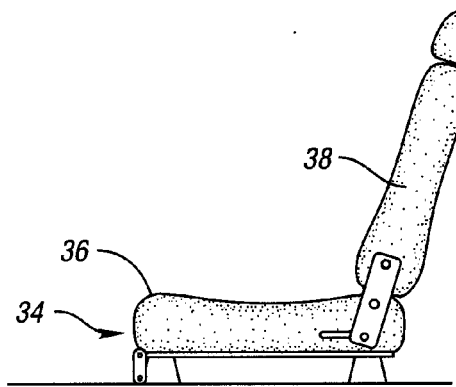
FIG. 9a is a side view of one of the seats of the present invention shown in the forward seating position.
Figure 9B:
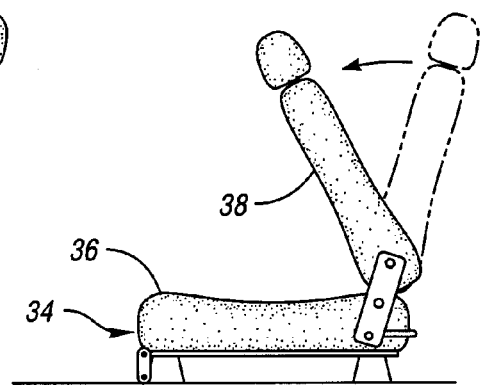
FIG. 9b is a side view of one of the seats of the present invention illustrating a first fold mechanism.
Figure 9C:
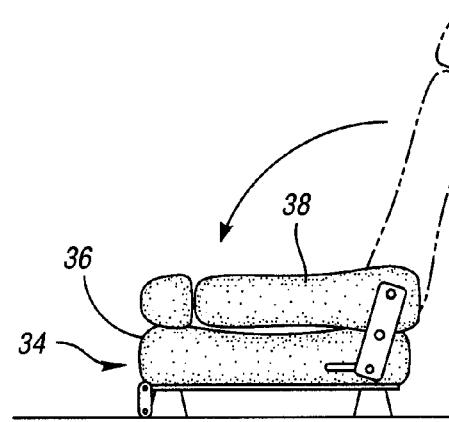
FIG. 9c is a side view of a seat of the present invention further illustrating the first fold mechanism.
Figure 9D:
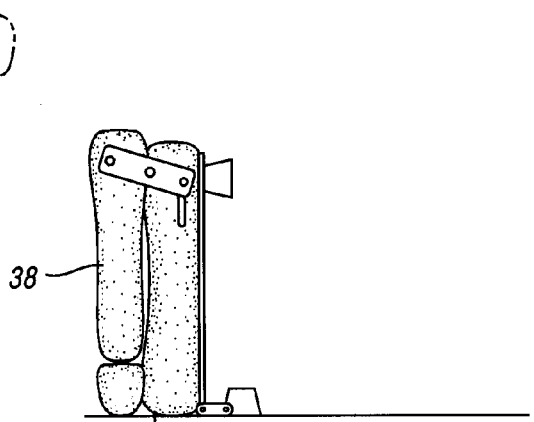
FIG. 9d is a seat of the present invention illustrating a first tumble mechanism.
Figure 10A:
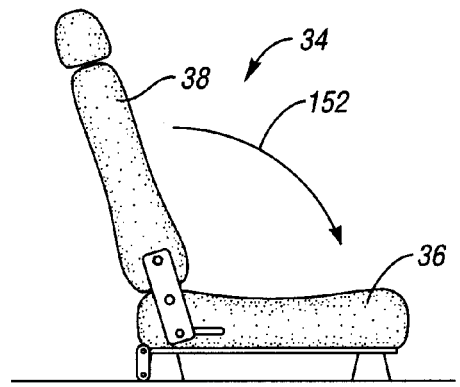
FIG. 10a is a seat of the present invention illustrated in the rearward seating position.
Figure 10B:
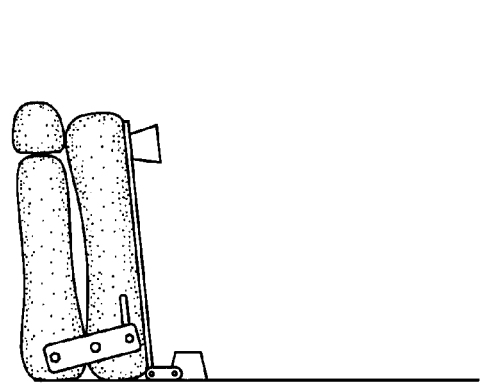
FIG. 10b is a side view of a seat of the present invention utilizing a second fold and tumble mechanism.
Figure 11:
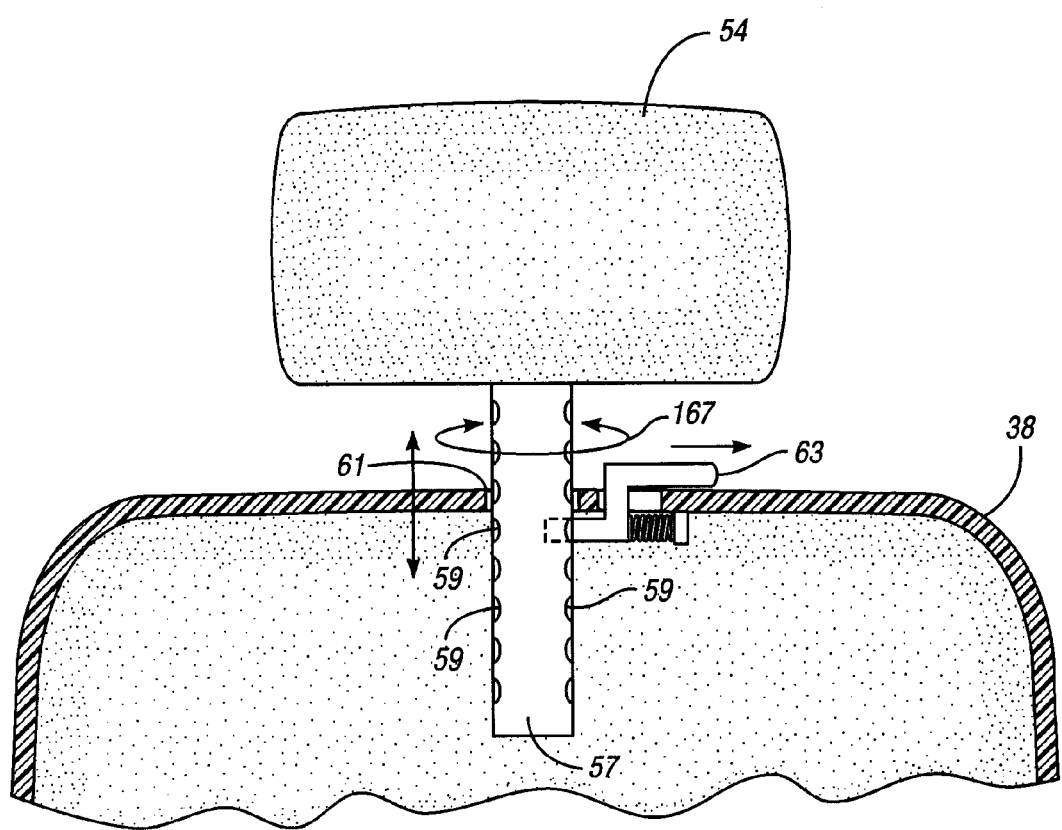
FIG. 11 is a frontal view of a headrest of one of the seats of the present invention.

In the present invention, when the seat 34 is in the forward facing position, backrest 38 may be pivoted downward as shown in FIG. 9b to a position where the backrest 38 is substantially parallel to the vehicle floor 150. The seat cushion 36 and backrest 38 can then be pivoted such that both are positioned perpendicular to the vehicle floor 150 as shown in FIG. 9d. If the vehicle seat 34 is positioned in the rearward seating position as shown in FIG. 10a, the backrest 38 may be pivoted downward in the direction of arrow 152 such that the backrest 38 and seat cushion 36 are both disposed parallel to vehicle floor 150. The mechanism to recline the backrest 38 to a position parallel with vehicle floor 150 is disclosed in FIG. 8. Once folded, the seat back and seat cushion may be pivoted such that they are both disposed in a vertical position with respect to the vehicle floor 150 as shown in FIG. 10b. The mechanism for this adjustment may be identical to the mechanism that provides the translation between seat positions shown in FIGS. 9c and 9d.

The present invention provides an improved uniquely versatile vehicle seat. To provide additional functionality and flexibility, the seat disclosed in the present application may be pivoted about its base to provide for a left or right seating position. As shown in FIGS. 15 and 16, the seat cushion 36 may be pivotally mounted to a seat base 158 having a pivot 160 and a plate 162. The plate 162 is disposed with at least two anchor positions 164 and 166 so that the seat cushion 36 can be rotated 90°. The seat cushion 36 also includes an attached locking structure 168 which may engage 164 or 166. It should be appreciated that vehicle seat can pivot 90° about pin 160 so that the seat may be translated from a forward facing position to a leftwardly seating position. It should be appreciated that the backrest 38 of the present invention can then be positioned on the opposing side of the seat cushion in a manner disclosed previously primarily with regard to FIGS. 3a-3g such that a leftwardly facing seat can be modified to a rightwardly facing seat. Additionally, the seat 34 can be positioned such that, if preferable, when in the leftwardly facing position or the rightwardly facing position, the vehicle door cannot be closed nor can the ignition be operated.

Referring back now to FIGS. 1a-1d, at least one reversible seat 34 is provided in vehicle 10. Preferably, reversible seat 34 is of the type previously described is detail herein.

In accordance with a certain embodiment of the present invention, the at least one reversible seat 34 is located in second row 28. Accordingly, the at least one reversible seat 34 can be adapted to face third row 30, as shown in FIG. 1b. Preferably, second row 28 comprises a plurality of reversible seats such that each reversible seat 34 can be adapted to face third row 30. In this embodiment, occupants in second row 28 face occupants in third row 30 facilitating face-to-face communications and easing interaction therebetween. For example, passengers traveling for business purposes can conduct meetings or conferences, while a driver takes them to their destination. Table 98 can be erected between second row 28 and third row 30 to enhance productivity by providing a surface by which to rest business papers or other work materials. In this embodiment, table 98 is similar to a conference table. As another example, families traveling on long road trips, such as during a vacation, may want to create an area for children to interact with one another. If desired, families could use table 98 to have a family meal during a trip. In this embodiment, table 98 is similar to a café table. In a certain embodiment, table 98 includes table base 100, which is received by a receptacle in the floor of vehicle 10, affixing table 98 thereto. Alternately, table 98 may not include a base, but rather is attachable to the sides of interior 12 such that it is supported laterally across interior 12 from one side to the other by projections 15 formed on the indoor walls. It is fully contemplated that there are many other reasons and uses for second row 28 to be adapted to face third row 30, such as common viewing of an entertainment system placed on the side wall of the vehicle in accordance with the teachings of the present invention. Further, the uses suggested for table 98 are merely exemplary, and it is contemplated that alternate uses are available.

Referring now to FIG. 1c, the at least one seat 34 is located in third row 30. Accordingly, the at least one reversible seat 34 can be adapted to face rearward such that occupants in third row 30 can peer out the rear of vehicle 10. It is contemplated that the at least one reversible seat 34 comprises a plurality of reversible seats such that each reversible seat 34 can be adapted to face rearward. In this particular embodiment, children of traveling families can sit in third row 30 and watch the scenery behind vehicle 10 disappear off in the distance. Often, vehicles of the type shown and described herein as vehicle 10 have liftgate 17 for providing access to rear cabin 16. When vehicle 10 is at rest, passengers can open liftgate 17, climb into reversible seat 34 located in third row 30, and enjoy the environment. For example, during a camping trip, while watching sporting events, or while tailgating, passengers can partake in the festivities from third row 30, with liftgate 17 ajar. In the event the whether becomes inclement, the passengers will be shielded while still having a great seat for enjoying the activities.

Additionally, the at least one seat 34 is located in first row 20. Accordingly, the at least one reversible seat 34 can be adapted to face second row 28. Preferably, the at least one reversible seat 34 in first row 20 comprises a plurality of reversible seats such that each reversible seat 34 can be adapted to face second row 28. In this particular embodiment, a passenger can adjust his seat to face rearward toward the passengers in second row 28 or third row 30, while the driver remains facing forward to navigate vehicle 10. When vehicle 10 is not in motion, the driver may also adjust his seat to face rearward toward passengers in second row 28 or third row 30. However, when vehicle 10 is in motion, the driver's seat is prevented from being adjusted to face rearward by a seat locking device 104. Seat locking device 104 prevents backrest 38 of the driver's seat from being adjusted to the rearward seating position when the vehicle ignition switch is in the run-start mode. Conversely, seat locking device 104 prevents turning the ignition switch to the run-start mode when backrest 38 of the driver's seat is adjusted in the rearward seating position. Seat locking device 104 can be an electromechanical device, such as a limit switch, proximity switch, or the like, that sends a signal to corresponding locking member 66 when the ignition switch is in the run-start position. Conversely, seat locking device 104 can send a signal to the vehicle's computer to either allow or prevent vehicle 10 from starting, depending on the position of reversible seat 34. Alternatively, seat locking device could engage the transmission lock so that the engine will only idle to provide HVAC and accessory power to the cabin. However, it is contemplated that the ignition switch may be turned to the accessory mode regardless of driver seat position.

Although the at least one reversible seat 34 is shown and described in either first row 20, second row 28 or third row 30, it is fully contemplated that the at least one reversible seat 34 can be located in first row 20, second row 28 and third row 30. Moreover, it is preferable that each seat in vehicle 10 comprises reversible seat 34.

Although reversible seat 34 provides for flexible seating within vehicle 10 for a multitude of travel situations standard on most vehicles today are airbags, both for driver and passenger, to protect in the event of a collision. These airbags are designed to be deployed when an occupant is facing forward toward the front of a vehicle. It may be unnecessary to deploy an airbag while an occupant faces rearward. Accordingly, each reversible seat 34 is equipped with airbag deactivation device 106. Airbag deactivation device 106 enables an airbag to be deployed upon collision when backrest 38 of reversible seat 34 is in the forward position. However, when reversible seat 34 is adjusted such that backrest 38 is in the rearward seating position, airbag deactivation device 106 disables the airbag. Airbag deactivation device 106 controls only the airbags corresponding to the reversible seat 34 to which the device is attached, but may be designed to correspond to a multitude of seating arrangements. Moreover, it is contemplated that airbag deactivation device 106 can enable one or more airbags, while disabling one or more other airbags, when reversible seat 34 is in the forward seating position. Upon adjusting reversible seat 34 to the rearward seating position, the previously enabled airbags become disabled, while the previously disabled airbags become enabled.

Airbag deactivation device 106 can be any device that senses the position of backrest 38 and can differentiate between backrest 38 being in the forward seating position or the rearward seating position, such as a limit switch or a proximity sensor, or the like. Airbag deactivation device 106 then sends an appropriate signal to the control unit of the airbag enabling or disabling the airbag. Airbag deactivation device 106 can be used in conjunction with seat locking device 104 to send signals to the appropriate modules. Moreover, it is contemplated that seat locking device 104 is the same as airbag deactivation device 106.

Primarily in the second row of seats 28, there may be a need to reposition the seat to facilitate the ingress and egress of a third row passenger. Illustrated in FIGS. 9 and 10 are alternative mechanisms to facilitate the ingress and egress. Various multi-positional seats are known in the art such as the "Multi-positional Seat Mounting Apparatus" of U.S. Pat. No. 6,000,742 which is incorporated herein by reference.

While the best mode for carrying out the invention has been described in detail, those familiar with the art to which this invention relates will recognize various alternative designs and embodiments for practicing the invention as defined by the following claims.

The invention claimed is:

1. An automotive seat for a vehicle comprising:
   a seat cushion which, in a first position, is tilted such that a front seating portion is positioned slightly higher than a rear seating portion, and a second position where said seat cushion is tilted such that the rear portion is positioned slightly higher than the front portion; and
   a backrest having a front face and a back face, a forward seating position having a seating surface generally defined by said front face of the backrest and said seat cushion in said first position and a rearward seating position having a seating surface generally defined by the back face of the backrest and the seat cushion in said second position;
   wherein the backrest back face is contoured by use of a bladder system while maintaining the front face substantially planar.

2. The invention according to claim 1, further comprising:
   a lap and shoulder restraint system integrated wit the backrest for use in connection with either of said front or back faces of said backrest.

3. The invention according to claim 2, wherein said lap and shoulder restraint system includes a buckle pivotally attached to said backrest.

4. The invention according to claim 2, wherein said lap and shoulder restraint system includes a shoulder strap that retracts into said backrest at or near a top of said backrest.

5. The invention according to claim 2, wherein said lap and shoulder restraint system includes a lap strap pivotally attached to said backrest at or near a bottom of said backrest.

6. The invention according to claim 2, wherein said backrest front face is expanded by use of the bladder system while said rear face is substantially planar or concave.

7. The invention according to claim 2, wherein said backrest front face is contoured to provide lateral support.

8. The invention according to claim 2, further comprising a reversible pocket selectively attached to the backrest for retaining articles for travel, wherein the pocket is adjacent the back face of the backrest when the backrest is in the forward seating position and is adjacent the front face of the backrest when the backrest is in the rearward seating position.

9. The invention according to claim 2, wherein said backrest back face is contoured to provide lateral support.

10. The invention according to claim 2, wherein said seat cushion is contoured to provide lateral support.

11. The invention according to claim 2, wherein said backrest is movable between a forward seating position where said backrest is coupled to said rear portion of the seat cushion and a rearward seating position where said backrest is coupled to said front portion of the seat cushion.

12. The invention according to claim 2 wherein said backrest is operatively locked in a rearward seating position by a locking mechanism disposed between said backrest and said seat cushion.

13. The invention according to claim 1, wherein said backrest includes a recline mechanism for altering the angle between the backrest and the seat cushion, wherein the recline mechanism is operable with the backrest in either the forward seating position or the rearward seating position.

14. The invention according to claim 1, further comprising an armrest pivotally attached to the backrest which can be pivoted to provide arm support for a seat occupant when the backrest is in either the forward or rearward seating positions.

15. The invention according to claim 14, further comprising a stop that prevents movement of said armrest below a generally horizontal plane.

16. The invention according to claim 1, wherein said bladder system is comprised of a plurality of bladders to provide support on either of the front face or the rear face of the backrest.

17. The invention according to claim 1, wherein said backrest has a horizontal cross section having two lateral sides and a midsection therebetween, wherein said cross section is wider at each lateral side than in the midsection.

18. The invention according to claim 8 further comprising:
 a stationary base member adapted to be secured to a vehicle floor and to the seat cushion;
 a seat track affixed to the lower surface of the seat cushion and slidably coupled to the stationary base member; and
 a first caster fixedly attached to the seat cushion nearest the front face.

19. The invention according to claim 18 further comprising a second caster fixedly attached to the seat cushion nearest the rear face.

20. The invention according to claim 19 wherein the first and second casters rest upon the vehicle floor during operation.

21. An automotive seat for a vehicle comprising:
 a seat cushion which, in a first position, is tilted such that a front seating portion is positioned slightly higher than a rear seating portion, and a second position where said seat cushion is tilted such that the rear portion is positioned slightly higher than the front portion;
 a backrest having a front face and a back face, a forward seating position having a seating surface generally defined by said front face of the backrest and said seat cushion in said first position and a rearward seating position having a seating surface generally defined by the back face of the backrest and the seat cushion in said second position; and
 an airbag deactivation device which deactivates an airbag when the seat is in said rearward seating position.

22. The invention according to claim 21, wherein the airbag deactivation device is a limit switch.

23. The invention according to claim 21, wherein the airbag deactivation device is a proximity switch.

24. An automotive seat for a vehicle comprising:
 a seat cushion having a front portion and a rear portion;
 a backrest coupled to the seat cushion and movable between a forward seating position where the backrest adjoins the rear portion and a rearward seating position where the backrest adjoins the front portion, said backrest having a front face and a back face;
 a restraint system integrated with the backrest for use when said backrest is in either the forward seating position or the rearward seating position; and
 an adjustable lumbar support retained within the backrest between the front face and the back face, wherein the lumbar support is selectively adjustable to support an occupant when the backrest is in either the forward or rearward seating positions;
 wherein said front face includes front lateral supports for use when the backrest is in the forward seating position, and said back face includes rear lateral supports for use when the backrest is in the rearward seating position.

25. The invention according to claim 24, further comprising a recline mechanism for altering the angle between the backrest and the seat cushion, wherein the recline mechanism is operable with the backrest in either the forward seating position or the rearward seating position.

26. The invention according to claim 24, further comprising an armrest pivotally attached to the backrest which can be pivoted to provide arm support for a seat occupant when the backrest is in either the forward or rearward seating positions.

27. The invention according to claim 26, further comprising a stop that prevents movement of said armrest below a horizontal plane.

28. The invention according to claim 24, further comprising a pocket selectively attached to the backrest for retaining articles, wherein the pocket is juxtaposed with the back face of the backrest when the backrest is in the forward seating position and is juxtaposed with the front face of the backrest when the backrest is in the rearward seating position.

29. An automotive seat for a vehicle comprising:
 a seat cushion which, in a first position, is tilted such that a front seating portion is positioned slightly higher than a rear seating portion, and a second position where said seat cushion is tilted such that the rear portion is positioned slightly higher than the front portion;
 a backrest having a front face and a back face, a forward seating position having a seating surface generally defined by said front face of the backrest and said seat cushion in said first position and a rearward seating position having a seating surface generally defined by the back face of the backrest and the seat cushion in said second position; and a reversible pocket selectively attached to the backrest for retaining articles for travel, wherein the pocket is adjacent the back face of the backrest when the backrest is in the forward seating position and is adjacent the front face of the backrest when the backrest is in the rearward seating position;

wherein said pocket is attached to said backrest by an elastic material.

30. An automotive seat for a vehicle comprising:
a seat cushion having a front portion and a rear portion;
a backrest coupled to the seat cushion and movable between a forward seating position where the backrest adjoins the rear portion and a rearward seating position where the backrest adjoins the front portion, said backrest having a front face and a back face;
a restraint system integrated with the backrest for use when said backrest is in either the forward seating position or the rearward seating position; and
an airbag deactivation device which deactivates the airbag when the backrest is in the rearward seating position;
wherein said front face includes front lateral supports for use when the backrest is in the forward seating position, and said back face includes rear lateral supports for use when the backrest is in the rearward seating position.

31. The invention according to claim 30, wherein the airbag deactivation device is a limit switch.

32. The invention according to claim 30, wherein the airbag deactivation device is a proximity switch.

33. An automotive seat for a vehicle comprising:
a seat cushion having a base, a front seating portion and a rear seating portion;
a guide member affixed to the seat cushion, said guide member extending from a first end adjacent the front portion to a second end adjacent the rear portion;
a seat bracket slidably engaged with said guide member;
a backrest coupled to the seat cushion by said seat bracket and slidably movable along the guide member between a forward seating position when the backrest adjoins the rear portion and a rearward seating position when the backrest adjoins the front portion; and
a biasing member operably connected to said guide member to tilt said front seating portion of said seat cushion such that said front portion is positioned higher than said rear portion when in said forward seating position;
wherein said biasing member further comprises a first pivoting cam coupled to said guide member near said first end, wherein said first cam is positioned to tilt said front portion of the seat cushion above the rear portion when said backrest is in said forward seating position.

34. The invention according to claim 33, further comprising a lap and shoulder restraint system integrated with the backrest for use in connection with either a front face or a back face of said backrest.

35. The invention according to claim 33, wherein said guide member includes a pair of linear tracks.

36. The invention according to claim 33, wherein said guide member includes a pair of arcuate tracks.

37. The invention according to claim 33, wherein said guide member includes an elongated tube.

38. The invention according to claim 37, wherein said guide member cooperates with at least one follower block attached to said seat bracket.

39. The invention according to claim 33, wherein said first pivoting cam is displaced by said seat bracket when said backrest is in said rearward seating position.

40. The invention according to claim 39, wherein the first cam is generally vertically biased and said first cam is caused to be rotated generally horizontally when the backrest is in the rearward seating position.

41. The invention according to claim 33, wherein said biasing member further comprises a second pivoting cam coupled to the guide member near said second end, wherein said second cam is positioned to tilt said rear portion of the seat cushion above the front portion when said backrest is in said rearward seating position.

42. The invention according to claim 41, wherein said second pivoting cam is displaced by said seat bracket when said backrest is in said forward seating position.

43. The invention according to claim 41, wherein the second cam is generally vertically biased and said second cam is caused to be rotated generally horizontally when the backrest is in the forward seating position.

44. An automotive seat for a vehicle comprising:
a seat cushion having a base, a front seating portion and a rear seating portion;
a guide member affixed to the seat cushion, said guide member extending from a first end adjacent the front portion to a second end adjacent the rear portion;
a seat bracket slidably engaged with said guide member;
a backrest coupled to the seat cushion by said seat bracket and slidably movable along the guide member between a forward seating position when the backrest adjoins the rear portion and a rearward seating position when the backrest adjoins the front portion;
a biasing member operably connected to said guide member to tilt said front seating portion of said seat cushion such that said front portion is positioned higher than said rear portion when in said forward seating position; and
a locking member at each end of said guide member for securing the backrest in either the forward seating position or the rearward seating position.

45. An automotive seat for a vehicle comprising:
a seat cushion which, in a first position, is tilted such that a front seating portion is positioned slightly higher than a rear seating portion, and a second position where said seat cushion is tilted such that the rear portion is positioned slightly higher than the front portion;
a backrest having a front face and a back face, a forward seating position having a seating surface generally defined by said front face of the backrest and said seat cushion in said first position and a rearward seating position having a seating surface generally defined by the back face of the backrest and the seat cushion in said second position; and
a reversible pocket selectively attached to the backrest for retaining articles for travel, wherein the pocket is adjacent the back face of the backrest when the backrest is in the forward seating position and is adjacent the front face of the backrest when the backrest is in the rearward seating position;
wherein said pocket is attached at lateral sides of the backrest.

* * * * *